(12) United States Patent
Niedert

(10) Patent No.: US 12,077,235 B2
(45) Date of Patent: Sep. 3, 2024

(54) NON-ARTICULATING COMMERCIAL VEHICLE

(71) Applicant: Gerald Thomas Niedert, Wheaton, IL (US)

(72) Inventor: Gerald Thomas Niedert, Wheaton, IL (US)

( * ) Notice: Subject to any disclaimer, the term of this patent is extended or adjusted under 35 U.S.C. 154(b) by 129 days.

(21) Appl. No.: 17/981,799

(22) Filed: Nov. 7, 2022

(65) Prior Publication Data

US 2024/0149943 A1    May 9, 2024

(51) Int. Cl.
*B62D 9/00* (2006.01)
*B60W 60/00* (2020.01)
*B62D 7/14* (2006.01)
*B62D 33/00* (2006.01)
*B62D 35/00* (2006.01)

(52) U.S. Cl.
CPC .......... *B62D 9/002* (2013.01); *B60W 60/001* (2020.02); *B62D 7/144* (2013.01); *B62D 33/00* (2013.01); *B62D 35/005* (2013.01)

(58) Field of Classification Search
CPC ........ B62D 9/002; B62D 7/144; B62D 33/00; B62D 35/00; B60W 60/001
USPC ...................................... 180/65.1
See application file for complete search history.

(56) References Cited

U.S. PATENT DOCUMENTS

| | | | |
|---|---|---|---|
| 2,110,213 A | | 3/1938 | Flowers |
| 4,446,941 A | * | 5/1984 | Laurich-Trost ........ B60K 17/10 180/242 |
| 4,770,265 A | * | 9/1988 | Allen ...................... B62D 7/159 701/41 |
| 7,316,288 B1 | * | 1/2008 | Bennett .................... B62K 5/08 180/413 |
| 7,338,335 B1 | | 3/2008 | Messano |
| 9,527,394 B1 | * | 12/2016 | Tang ..................... B60W 10/26 |
| 9,561,828 B2 | * | 2/2017 | Niu ......................... B60L 50/64 |
| 10,899,192 B2 | * | 1/2021 | Larson ............... B60H 1/00014 |
| 11,440,456 B1 | | 9/2022 | Willison et al. |
| 2005/0115753 A1 | * | 6/2005 | Pemberton ............... B62D 1/28 180/167 |
| 2007/0089916 A1 | | 4/2007 | Lundstrom |
| 2009/0243237 A1 | | 10/2009 | Sasaki |
| 2010/0101876 A1 | | 4/2010 | Misencik |
| 2011/0198145 A1 | | 8/2011 | Bullis |
| 2017/0166212 A1 | | 6/2017 | Flaum et al. |
| 2017/0217303 A1 | * | 8/2017 | Widek ..................... B60K 6/52 |

(Continued)

*Primary Examiner* — Hau V Phan
(74) *Attorney, Agent, or Firm* — Michael P. Mazza, LLC; Michael P Mazza

(57) ABSTRACT

A commercial vehicle having various GVWR configurations with a vehicle body with two or more axles, and a cab that does not pivot relative to the vehicle body, and a battery-electric-powered or hydrogen-electric-powered propulsion system. The vehicle has a center of gravity that is substantially lower, and a track width which is substantially narrower, than an articulating tractor-trailer combination with a trailer size comparable to the vehicle body of the present invention, providing substantially increased stability, and with all axles steerable, substantially improving the turning and trailing of the vehicle. Additional attributes are improved safety, increased payload weight and cubic capacity, higher productivity and lower maintenance costs. Many other advantages flow from this vehicle design.

20 Claims, 18 Drawing Sheets

(56) References Cited

U.S. PATENT DOCUMENTS

| | | |
|---|---|---|
| 2018/0056769 A1 | 3/2018 | Kerspe et al. |
| 2021/0046978 A1 | 2/2021 | Forostovsky et al. |
| 2021/0138853 A1 | 5/2021 | Wuerthele et al. |

* cited by examiner

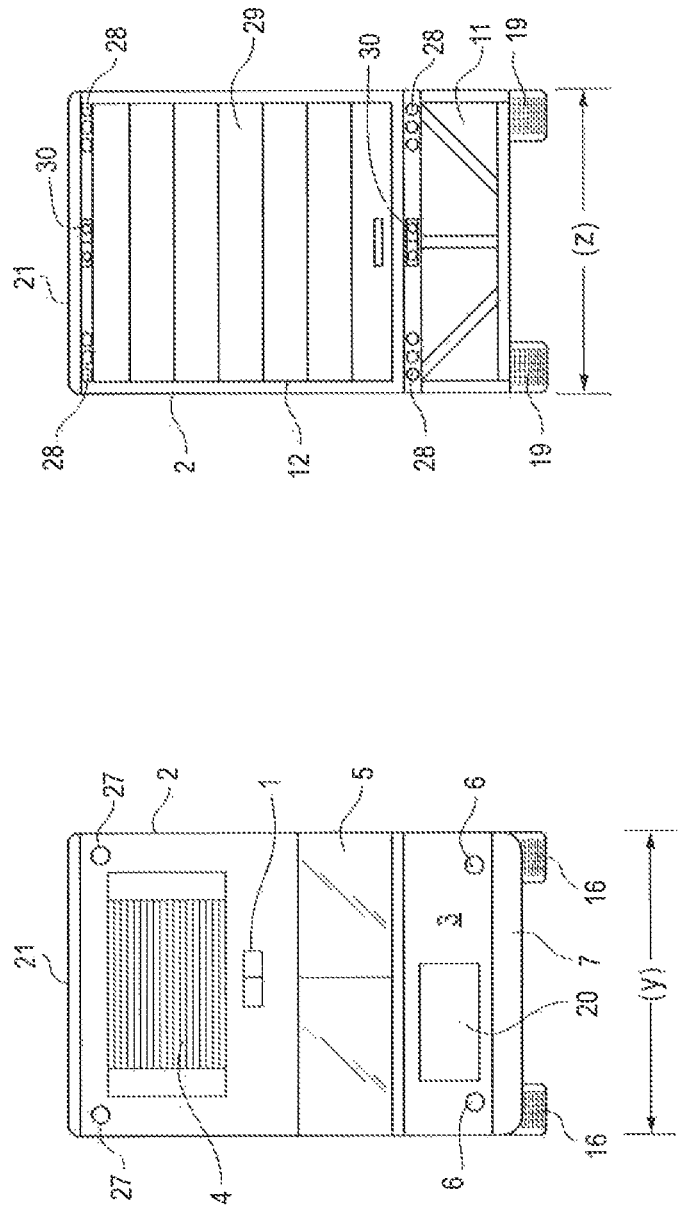

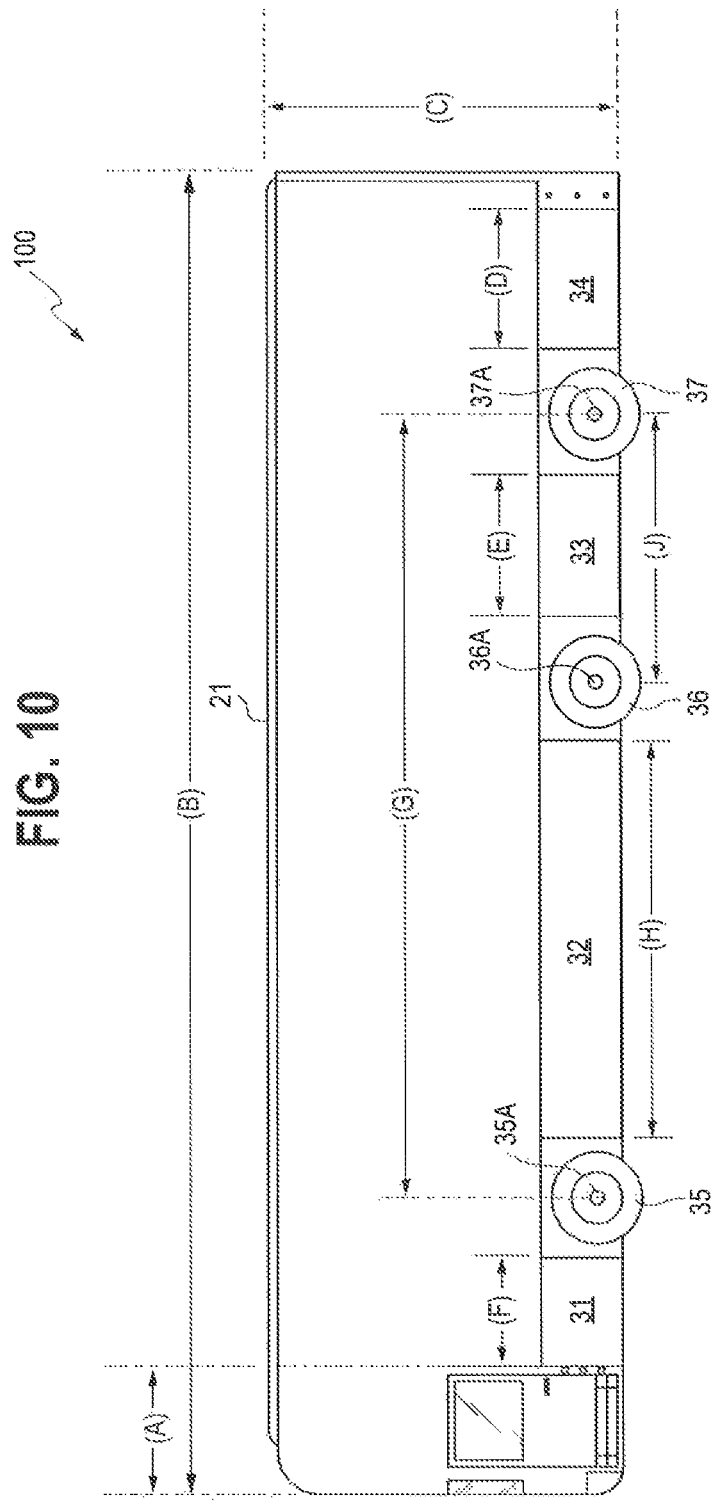

NON-ARTICULATING COMMERCIAL VEHICLE

BACKGROUND OF THE INVENTION

The present invention generally relates to integrated, non-articulating, electric-powered commercial vehicles which are an alternative to 2-axle, non-articulating commercial straight trucks, and 3-axle, 4-axle and 5-axle articulating trailer-tractor combination commercial vehicles, and provide specific advantages when used in private fleets, specialized transportation operations and common carrier transportation operations where increased cubic capacity is essential.

The exemplary non-articulating vehicle designs of the present invention have specific characteristics that demonstrate significant advantages when comparing such vehicles to articulating trailer-tractor combination commercial vehicles and two (2) axle straight trucks in common use today. Such advantages include: increased cubic capacity; more efficient axle loading; greater operational stability; increased operating range (relative to battery electric tractors and trucks); safer tracking and better maneuverability (e.g., the FMCSA reports that thirty-two present (32%) percent of truck accidents are caused by trucks travelling over the center line or off the road, per Top 4 Causes of Tractor Trailer Accidents—Commonwealth Law. Group (hurtinva.com); more effective aerodynamic design; reduced rolling resistance; better braking balance leading to shorter stopping distances; lower maintenance costs; and less expensive manufacturing costs, as articulating designs require building two vehicles as compared to a single vehicle with this non-articulating design. Advantages of the 2-axle non-articulating commercial vehicle of the present invention, as compared to 2-axle commercial vehicles in common use today, include a longer body length, more efficient axle loading, increased cargo weight capacity and a lighter vehicle (i.e., consisting of a single integrated unit rather than a separate cab and body).

The dominant/conventional commercial highway trailer length for tractor-trailer combination vehicles is fifty-three (53) feet. Providing a commercial vehicle design with a vehicle body that exceeds this length can, in many circumstances, prove highly profitable for truck operators and/or the companies they service. However, a design increasing trailer length is difficult to achieve for existing tractor-trailer designs, given the disadvantages of tractor-trailer combinations listed above, and discussed further below.

While different commercial vehicle designs have attempted to address some of these issues, they have generally done so in the context of vehicles with "articulating" vehicle bodies (i.e., vehicle bodies which pivot relative to the tractor/cab). In other words, commercial vehicle designers have generally not addressed these problems using an integrated, non-articulating vehicle designs. In addition to the fact that such designs would "break the mold" from traditional vehicle designs, there is another reason for not pursuing integrated, non-articulated vehicle designs within the United States: such designs for such integrated and non-articulating vehicles may not be currently legal in the United States, given current federal bridge and length laws. However, once a designer evaluates solutions based on integrated, non-articulated vehicle design, the design perspective radically changes.

The inventor has spent 45 years in the commercial highway transportation business, owning and operating four motor carriers and one full-service commercial truck leasing company, with a total fleet size among all 5 businesses of 2,700 tractors, 400 straight trucks and between 4,000 and 4,500 semi-trailers.

Heavy truck classifications are usually made with Class 6, 7 and 8 truck size designations; however, the present invention will be better understood using exemplary disclosures of heavy truck design configurations in two (2) axle, three (3) axle, four (4) axle and five (5) axle sizes. All configurations of the present invention are of the same non-articulating design, with the only differences being in vehicle body length, height, number of axles and whether the propulsion system is hydrogen-electric or battery-electric, as one propulsion system may be better suited to operational applications than the other.

These configurations of the present invention are not intended to replace heavy duty commercial vehicles in use today, but rather are designed to offer an alternative to a significant percentage of the types of commercial vehicles used in local and regional transportation, private fleet operations, specialized transportation operations and specific types of common (for-hire) carrier operations, as they provide beneficial design elements unavailable in today's commercial vehicle designs.

First and foremost, the design configurations of the present invention are intended to offer four (4) primary benefits over articulating trailer-tractor combinations, and non-articulating, two (2) axle straight trucks in common use today: 1) eliminate compression-ignition propulsion, whether from diesel fuel, gasoline, propane or natural gas, and replace it with zero-emission battery-electric or hydrogen-electric propulsion; 2) create exemplary heavy truck sizes that are all engineered to be immediately ready for integration of Level 5 Autonomous Vehicle Architecture; 3) create significant improvements to commercial transportation productivity; and 4) introduce safer trucks onto our Nation's highways.

Everyone wants cleaner trucks, safer trucks and more reliable supply chains, and the design configurations of the present invention do exactly that. The switch from diesel to electric is going slowly because the cost/benefit equation is negative, and because there are few incentives, other than tax incentives and tax credits, to encourage fleets to switch. Providing the heavy truck operator with the option of purchasing trucks that are safer and more productive will expedite this switch as the cost/benefit equation should then be positive.

The specific benefits, all relating to the four (4) benefits listed above, applicable to all exemplary configurations of the present invention, as compared to both straight trucks and articulating combination tractor-trailer vehicles in common use today, include:

1) increased cubic capacity;
2) increased payloads with more efficient axle loading;
3) lighter weight (relative to five (5) axle tractor-trailer combinations);
4) more stable with low center of gravity;
5) reduced body roll on curves
6) eliminates jackknifes;
7) eliminates all manual connections of low and high voltage electric wires and compressed air lines;
8) separate and distinct energy storage and distribution systems for: a) vehicle propulsion and b) for all vehicle non-propulsion energy requirements;
9) larger, more safe, more secure and more accessible space for the systems that produce compressed air and electric energy;
10) enabling faster adoption of Level 5 Autonomous Vehicle Architecture;

11) all wheel steering
12) safer tracking at low and high speeds;
13) narrower vehicle path when turning;
14) safer lane changing with faster steering response;
15) improved maneuverability, both in forward and reverse movements;
16) more efficient use of zero-emission energy with larger solar panels and regenerative braking at all wheels;
17) larger capacity pneumatic systems for increased and more reliable compressed air energy for suspension and tire inflation systems;
18) more overall aerodynamic design;
19) eliminates all hydraulic powered systems;
20) reduced rolling resistance;
21) better brake balance for shorter stopping distances;
22) less expensive to build;
23) less expensive to maintain;
24) longer operating range with battery-electric power;
25) multiple and integrated battery charging ports; and
26) safer operator entrance and exit.

Most of these benefits are self-evident, while some require design specifications from Tier 1 Suppliers, most specifically for braking, steering, energy storage and distribution systems (ESDS), and for the integration of Level 5 Automation. Some of the stated benefits can only be precisely quantified with the building of a prototype subjected to wind-tunnel testing, steering and braking under loaded road conditions, and the testing of automated system functionality (requiring enormous cost).

While different heavy truck OEM's (Original Equipment Manufacturers) have attempted to address some of these issues, they have done so generally in the context of articulating tractor-trailer combination vehicles, and have not addressed these issues using a non-articulating integrated design. Outside this context, OFMs will need to address the current weight and length restrictions which apply to current truck configurations, detailing the inherent limitations of such configurations, which is where a prototype may be important for successfully addressing such limitations.

Accordingly, there is a need for commercial vehicle configurations with integrated, non-articulating bodies that address the limitations discussed above that are inherent in the design of most two (2) axle straight trucks and three (3) four (4) and five (5) axle articulating tractor-trailer combination vehicle configurations, and this need is addressed by the design characteristics of the vehicle configurations disclosed herein, providing advantages, benefits and specific solutions as disclosed herein.

SUMMARY OF THE INVENTION

The objects mentioned above, as well as other objects, are addressed with solutions offered by the present invention, which overcomes specific disadvantages of prior commercial vehicles, while providing new advantages not previously associated with earlier vehicle designs. This summary is provided to introduce a selection of concepts in a simplified form that are further described below in the Detailed Description, so that the claimed invention may be better understood. However, this summary is not intended to limit the scope of the claimed subject matter.

The present invention is primarily intended for three heavy truck integrated, non-articulating design configurations: (1) a two (2) axle with a maximum GVWR (Gross Vehicle Weight Rating) of 40,000 lbs.; (2) a three (3) axle with a maximum GVWR of 60,000 lbs.; and (3) a four (4) axle with a maximum GVWR of 80,000 lbs. Each different design configuration is intended as an alternative to current two (2) axle straight trucks, (3) three axle tractor-trailer combinations, and four (4) and (5) axle tractor trailer combinations.

In every case, each such alternative configuration may significantly improve safety and may greatly increase productivity. Each alternative configuration is also preferably designed to be more readily adaptable to incorporating all of the components of Level 5 Autonomous Vehicle Architecture. Additionally, by offering heavy truck users these specific advantages it may accelerate the use of commercial vehicles that exclusively use only zero emission (clean) energy for propulsion.

The reference to Level 5 Autonomous Vehicle Architecture describes the controls for the performance and safety functions of the vehicle using on-board systems for such control. Level 5 is the point where the vehicle systems and controls can perform all vehicle functions without the interactions or assistance of a human; however, even as everyone's goal is to get to the point where self-driving commercial vehicles is a reality, it will no doubt be the decision of regulators to continue to require a human operator in the vehicle when any autonomous systems are engaged. (At this point in the development of heavy truck autonomous systems, engineers and designers are very close to achieving the operational standards and performance requirements of Level 4 Autonomous Vehicle Architecture.)

With these design benefits in mind, the need for government incentives to speed the movement away from greenhouse gas emissions may also be significantly reduced, taking a significant step in the direction of improving air quality. Just as important is reducing highway injury and death. Secondary, but still important, goals include improving supply chain performance, creating a very positive effect on the chronic truck driver shortage, and reducing the cost of commercial transportation.

Current articulating tractor-trailer configurations fall short as a result of having a separate trailing vehicle as part of the combination, where the coupling to such trailing vehicle must be performed manually, connecting high and low voltage wires, compressed air lines, and camera, telematic and radar signal wires, and manually done every time the trailer is connected and disconnected from the tractor, subjecting all vital elements for successful Level 5 functionality to a manual operation, and making it impossible to insure a fail-safe environment where the tractor-trailer connections mentioned above are continuously subjected to coupling failures from improper coupling procedures, damaged seals, contamination from dirt, moisture, salt, ice, and the ever-present possibility that these loose lines and hoses may get snagged or cut or disconnected as they are exposed in the open and pivoting space between the tractor and trailer.

To underscore the design advantages of the preferred embodiment of the present invention, as compared to conventional tractor-trailer combination vehicles, the American Trucking Association (ATA) and the International Society of Automotive Engineers (SAE), at their February 2020 Annual Meeting and Transportation Technology Exhibition, addressed this specific issue within the broader context of: "*The Confluence of a Number of Technical Events and Needs Assessments*", and with that 'overlay' the focus of the Third Annual Truck Maintenance Council of the ATA-SAE Symposium was: "*The Combination Vehicle as a Connected Whole*", where the stated purpose was to discuss the inherent limitations of connectivity, communications and integrated systems in tractor-trailer combinations, and the need to overcome such limitations as the evolution of autonomous vehicle systems accelerates.

In its 4$^{th}$ Quarter 2022 Edition, "Calibrate", The Quarterly Magazine for Equipment and Maintenance Executives, highlighted this problem of connectivity between tractors and trailers, in an article titled: 'Down to the Wire'. Several quotes from this are as follows:

Robert Braswell, Executive Director of the American Trucking Association Technology and Maintenance Council, referring to the tractor-trailer connectivity, made these comments: 'maintaining the cables requires frequent attention; they are wearable items, not durable ones. You're going through them like crazy, if for no other reason than sometimes you forget to hook them up and they get dragged down the road, or they get improperly connected, or they are unmated in a rough way for some reason.' Braswell goes on to say: 'Somebody forgets to disconnect when they do the separation; there's all sorts of ways you can damage these things.

In the same publication, same edition, Mike Grima, Vice President of Equipment Services for Yellow Freight, (a publicly-held $5 billion motor carrier) referring again to tractor-trailer connectivity, says: 'fleets are in a constant battle with corrosion-causing moisture. The problem is made worse by magnesium chloride, which is used to treat roadways for ice and snow; it draws moisture from the air; once it gets into a wiring harness it acts like a sponge and can wick upstream or downstream, causing corrosion further down the line.'

Level 5 Autonomous Vehicle Architecture installed on the three (3) and four (4) axle non-articulating configurations of the present invention becomes far more reliable as all elements of the controls are hard-wired and plumbed and enclosed in protective carriers, making certain that camera and radar connectivity, signal sensors, telematics, brake and steering controller connectivity, low and high voltage electric connectivity and compressed air are all in a sealed environment, hard wired, secure, and where applicable, built into heated enclosures.

In a preferred embodiment of the invention, an integrated, non-articulating commercial vehicle is provided with a vehicle body having two or more axles, and a cab that does not pivot relative to the vehicle body. The vehicle has a battery-electric-powered or hydrogen-electric-powered propulsion system, and the vehicle body has a center of gravity that is substantially lower than a center of gravity for an articulating tractor-trailer combination commercial vehicle with a comparably-sized vehicle body.

In another preferred embodiment of the invention, an integrated, non-articulating commercial vehicle is provided with a vehicle body having two or more axles, and a cab that does not pivot relative to the vehicle body. The vehicle has a battery-electric-powered or hydrogen-electric-powered propulsion system, and the vehicle has a maximum wheel track width which is substantially less than the maximum wheel track width of an articulating tractor-trailer combination commercial vehicle with a comparably-sized vehicle body.

With either preferred embodiment, the vehicle may include any of the following features. The vehicle may include wheels with single-wide-based tires at all axle positions, and with a tire air pressure management system manages the air pressure for each tire. All electric and pneumatic components may be hard-wired and permanently connected.

In one preferred design configuration, the vehicle has a maximum GVWR of 40,000 pounds, a front non-driven steer axle, a rear-driven steer axle, a wheelbase of between 20-29 feet, a body length of between 41-50 feet, and the rear axle is driven by a battery-electric propulsion system. With this design configuration, the cargo body length is between 36-45 feet, and the energy space is between 56-68 lineal feet.

In another preferred design configuration, the vehicle has a maximum GVWR of 60,000 pounds, a wheelbase of between 32-39 feet, a body length of between 53-60 feet, and at least three axles, all steer axles, including at least a front axle, a rear axle, and an intermediate axle located between the front and rear axles. The intermediate and rear axles are each driven by a battery-electric or hydrogen-electric propulsion system. With this design configuration, the cargo body length is between 48-55 feet, and the energy space is between 64-78 lineal feet.

In still another preferred design configuration, the vehicle has a maximum GVWR of 80,000 pounds, a wheelbase of at least 51 feet, a body length of between 62-72 feet, and at least four axles, including at least a front axle, a rear axle, and at least two middle axles located between the front and rear axles. At least the rear axle, and the middle axle located closer to the rear axle than the front axle, are independently driven by a battery-electric or hydrogen-electric propulsion system. With this design configuration, the cargo body length is between 57-67 feet, and the energy space is between 74-84 lineal feet.

In the design configurations described above, the vehicle may have all-wheel steering, and has a substantially increased cargo volumetric capacity in relation to an articulating tractor-trailer combination commercial vehicle with a comparably-sized vehicle body. The vehicle also has a substantially increased weight-carrying capacity in relation to an articulating tractor-trailer combination commercial vehicle with a comparably-sized vehicle body. Preferably, a water-level load on each axle is substantially equal, all axles are located directly under the vehicle body, and ride height control pneumatic suspension is provided at each axle.

A top portion of the vehicle may include solar panels used to power refrigeration and heating inside the vehicle body, and for reserve power. The vehicle body may include energy storage and delivery systems ("ESDS") providing power for battery-electric or hydrogen-electric systems. The ESDS may be housed in undermount spaced located near a center of the vehicle, enabling the vehicle to function with a dual axle drive system where each drive axle can be operated independently.

The vehicle preferably includes electric brakes, electric steering components which are hard-wired to all axles, pnand eumatic suspension systems that are permanently plumbed from pressurized air tanks to all axles. Preferably no hydraulic systems are used, and compressed air energy is produced by electric air compressors and pressurized supply air and service air tanks.

The vehicle has a lower or similar drag coefficient to that of an articulating tractor-trailer combination commercial vehicle having a trailer with a comparably-sized overall length to that of the vehicle body of the non-articulating vehicle. Also, preferably, the vehicle body is fully skirted, and includes aerodynamic front bumpers and aerodynamic wheel covers, and front sides and a roof shaped for reduced drag.

Preferably, electric brake systems provide regenerative energy production at all wheels. It is also preferred that electric, hard-wired rear-mounted cargo lifts and electric, hard-wired electric braking systems are used, and each regenerate electricity back to a source of energy production.

Preferably, all of the axles have compressed air suspension systems controlling axle weight equalization and frame height control, with the compressed air originating from a system with a redundant backup.

Preferably, the vehicle facilitates adoption of Level 5 autonomous vehicle architecture using hard-wired electrical connectivity, directly-plumbed pneumatic connectivity, and all-wheel steering.

Definition of Claim Terms

The terms used in the claims of the patent are intended to have their broadest meaning consistent with the requirements of law. Where alternative meanings are possible, the broadest meaning is intended. All words used in the claims are intended to be used in the normal, customary usage of grammar and the English language.

"Energy space" means the amount of open and available at or below top-of-frame linear space for all componentry responsible for the production of all energy requirements of the vehicle, consisting entirely of electric energy and compressed air energy.

"Integrated" means the cab and vehicle body are built as a single unit.

"Non-articulated" means the vehicle body does not pivot relative to the cab, which is the case with articulating tractor-trailer combination vehicles; and conversely, "articulating" means at least two separate vehicles coupled together at a single hinge-point.

BRIEF DESCRIPTION OF THE DRAWINGS

The novel features which are characteristic of the invention are set forth in the appended claims. The invention itself, however, together with further objects and attendant advantages thereof, may be better understood by reference to the following description taken in connection with the accompanying drawings, in which:

FIG. 8 is a front view of the vehicle shown in FIG. 1, and is also a front view of the vehicle shown in FIG. 10, and a front view of the vehicle shown in FIG. 11;

FIG. 9 is a rear view of the vehicle shown in FIG. 1, and is also a rear view of the vehicle shown in FIG. 10, and a rear view of the vehicle shown in FIG. 11;

FIG. 10 is a left-side view of the first exemplary alternative example of the present invention, a commercial vehicle with a three-axle, 60,000-lb. GVWR;

Figure 1:
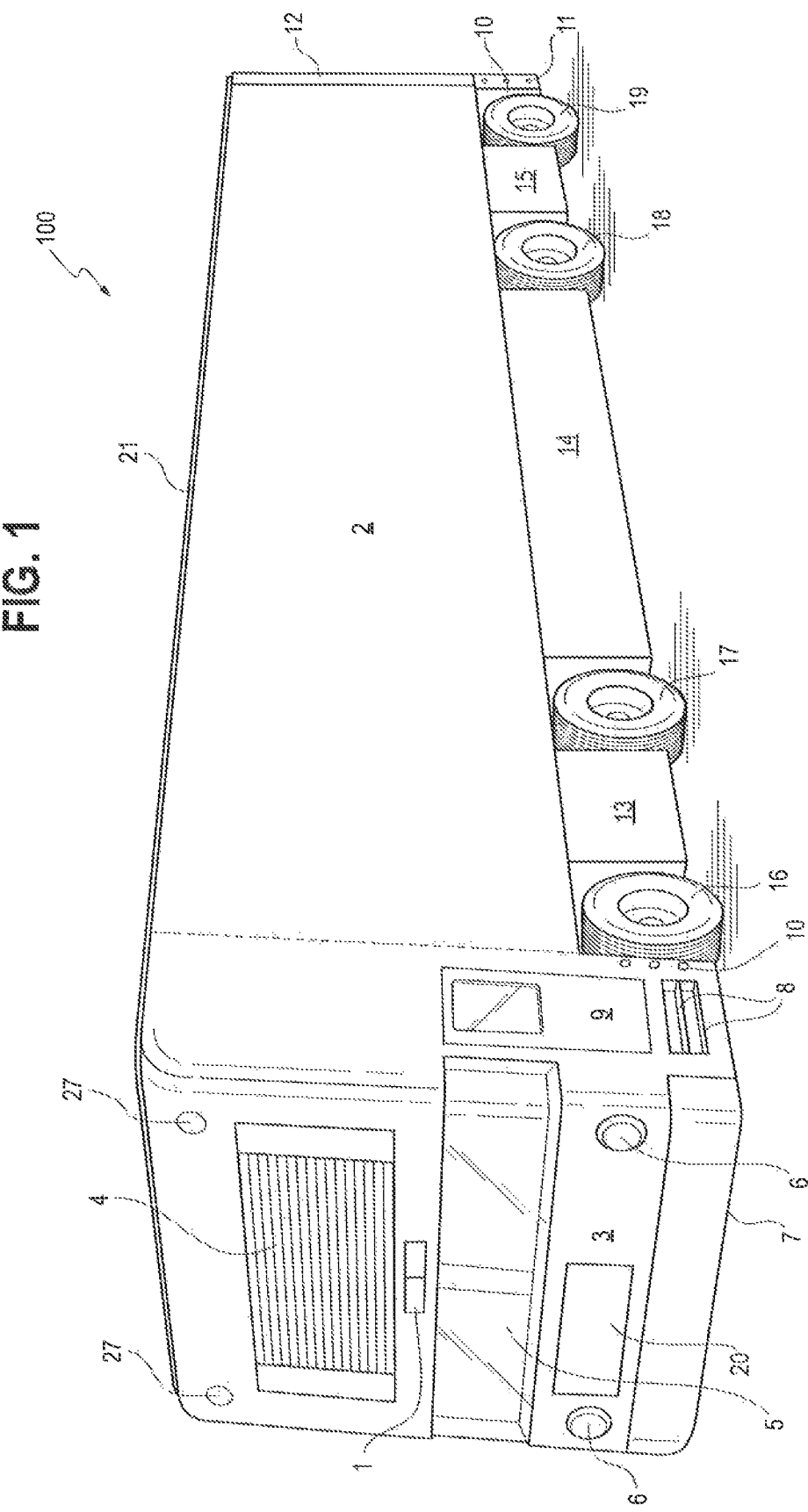
FIG. 1 is a front and left-side perspective view of a preferred example of the commercial vehicle of the present invention, with an 80,000 lb. GVWR.

The components in the drawings are not necessarily to scale (other than FIGS. 16-20, which are drawn to scale), emphasis instead being placed upon clearly illustrating the principles of the present invention. In the drawings the referenced numerals designate corresponding parts throughout the several views, and referenced letters in such drawings designate specific component dimensions of the three exemplary examples of the present invention.

DETAILED DESCRIPTION OF THE PREFERRED EMBODIMENTS

Set forth below is a description of what are believed to be the preferred embodiments and/or best examples of the invention claimed. Future and present alternatives and modifications to this preferred embodiment are contemplated. Any alternatives or modifications which make insubstantial changes in function, in purpose, in structure, or in result are intended to be covered by the claims of this patent.

The present invention specifically refers to commercial vehicles with integrated, non-articulating vehicle bodies (i.e., there is no separate cab/tractor, and the operator compartment and vehicle body are a single, integrated unit). Referring first to FIG. 1, a preferred example of the present invention is shown, which is a four-axle, 80,000 lb. GVWR vehicle that is 62 feet in overall length. In this example, motive force is supplied by battery-electric or hydrogen-electric propulsion systems to the two rear axles ("drive axles") identified as 18A and 19A (see FIGS. 1, 2, 5 and 7), while the front two axles 16A, 17A, more closely adjacent to the operator's compartment 3 (FIGS. 1 and 8), are non-driven axles. (Tires 16-19 correspond to axles 16A-19A.) Preferably, all four axles 16A-19A are fully-functional steerable axles.

None of the drawings in FIGS. 1 through 11 are drawn to scale; however, where measurements are indicated, such measurements are exact.

Referring to FIGS. 1-41, the commercial vehicle of the present invention shown in those drawings has the following reference numerals corresponding to the following components:

- 1: forward looking cameras and radar;
- 2: cargo body;
- 3: operator's compartment;
- 4: electric cargo refrigeration/heating system;
- 5: windshield;
- 6: laser-diode headlights;
- 7: aerodynamic front bumper;
- 8: steps to operator's compartment;
- 9: door to operator's compartment;
- 10: front and rear side-looking cameras, radar and marker lights;
- 11: rear crash underride protection (also the location of undermount tuck-a-way or glide-under electric cargo lifting device, if such device is specified);
- 12: rear door frame (also the location of rear frame mounted electric rail-lift cargo lifting device, if such device is specified);
- 13: forward undermount space;
- 14: middle, and primary undermount space for vehicle propulsion ESDS (Energy Storage and Distribution System) components for propulsion);
- 15: rear undermount space;
- 16-19: front (16-17) and rear (18-19) tires;
- 16A-19A: front (16A-17A) and rear (18A and 19A) axles
- 20: front access panel;
- 21: solar panels
- 22: primary portal for access to propulsion, non-propulsion, communication and Level 5 controls, opposite operator entrance door 9
- 23: rear undermount space
- 24: middle undermount space
- 25: front undermount space
- 27: front LED marker lights.
- 28: top and bottom LED rear marker lights and stop-and-turn lights;
- 29: electric roll-up rear door (rear swing-type doors rather than roll-up doors may be used);
- 30: rear looking cameras and radar.

Referring now to FIGS. 1, 4, 5 and 7, undermount spaces 14 and 24 are identical in size and house only ESDS componentry used for vehicle propulsion. Such componentry, identical to each such space, may include high voltage battery packs, TMS (thermal management systems) to manage the temperature of the batteries, high voltage power distribution controllers, inverters, high voltage charging controllers, charging ports, and junction boxes for high voltage wire distribution.

The electric drive motors that are powered by this ESDS componentry need not be not located in these spaces, but are preferably directly attached to the rear driven axle differentials.

If propulsion is provided by hydrogen-electric, the battery-electric componentry identified in the paragraphs directly above may be replaced with liquid or gaseous hydrogen, fuel cells, and all other related componentry for such vehicle propulsion.

Undermount spaces 13 and 25 (see FIGS. 1, 4, 5 and 7) house ESDS for non-propulsion functions of the vehicle, which may include the battery packs, TMS, inverters, AC/DC converters, power distribution controllers, charging ports, high and low voltage charging controllers, and junction boxes for high and low voltage wire distribution.

The ESDS housed in undermount spaces 13 and 25 may be used to provide power for electric braking and electric steering systems for the two forward axles, power for the RVAC system in the operator's compartment, power for front and side lighting, power for autonomous system controllers, power for on-board camera and radar systems, telematics, communication systems, reserve power for the cargo heating/refrigeration system, and power for all other miscellaneous items in the operator's compartment, such as wipers, windows and seating controls.

Preferably, each undermount space 13, 25 houses one electric air compressor, two compressed air tanks, one a supply tank and the other a service tank (with all four air tanks mounted inside the frame rails), providing compressed air energy for the load-leveling and ride-height control suspension systems on the two forward axles and for the tire air pressure management systems for the four tires on the two forward axles.

Undermount spaces 15 and 23 (see FIGS. 1, 4, 5 and 7) may be exactly the same size as undermount spaces 13 and 25, and may also house ESDS and related pneumatic and electric components for managing autonomous systems, rear lighting, communications, camera and radar systems, steering, suspension, braking and tire inflation for the rear two axles, including two electric air compressors and four pressurized air tanks (all mounted inside the frame rails). Additionally, undermount spaces 15 and 23 may house ESDS components that control the electric roll-up rear door and high-capacity electric cargo rail-lift located at the rear of the cargo body.

Figure 2:
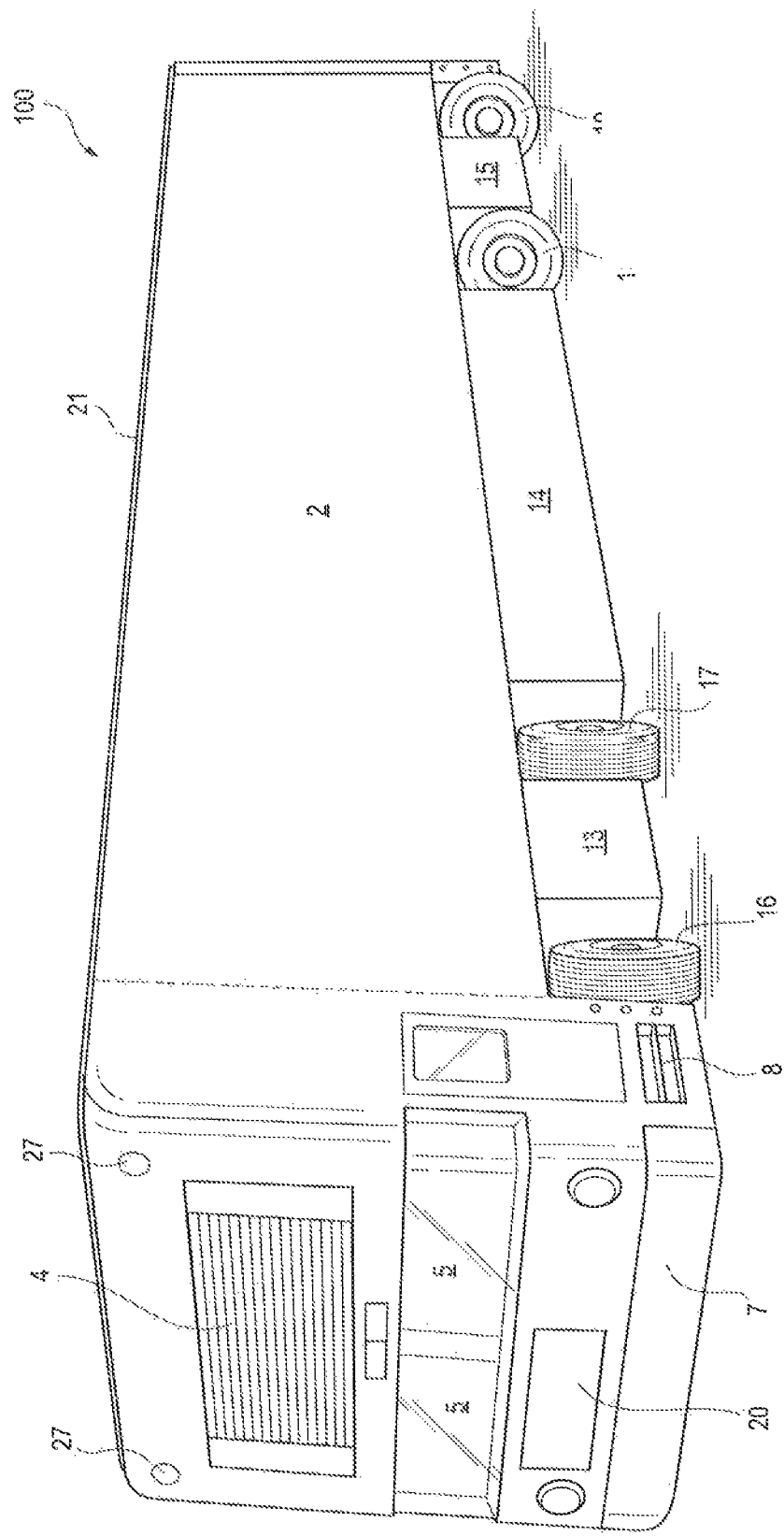
FIG. 2 is a view similar to FIG. 1 with the vehicle executing a left-hand turn.
Figure 3:
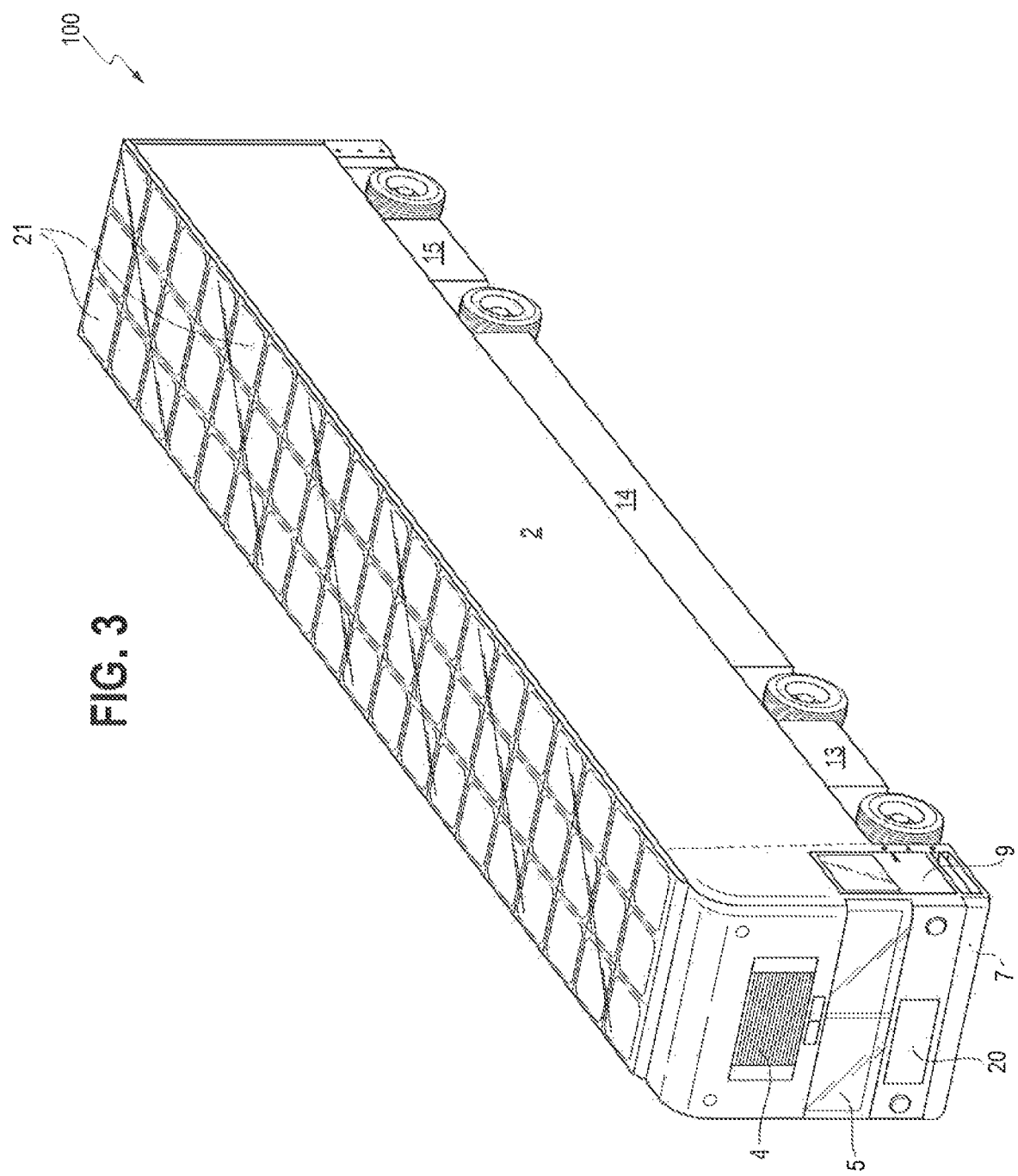
FIG. 3 is a top and left-side view of the vehicle shown in FIG. 1.

Referring to FIGS. 2 and 3, FIG. 2 illustrates the vehicle of the present invention executing a left turn with all wheels in steering mode. FIG. 3 illustrates the top of the vehicle body, including solar panels 21, designed to provide power for refrigeration/heating of cargo body 2, and for reserve electric power if the vehicle is not equipped with a cargo refrigeration/heating system.

Figure 4:
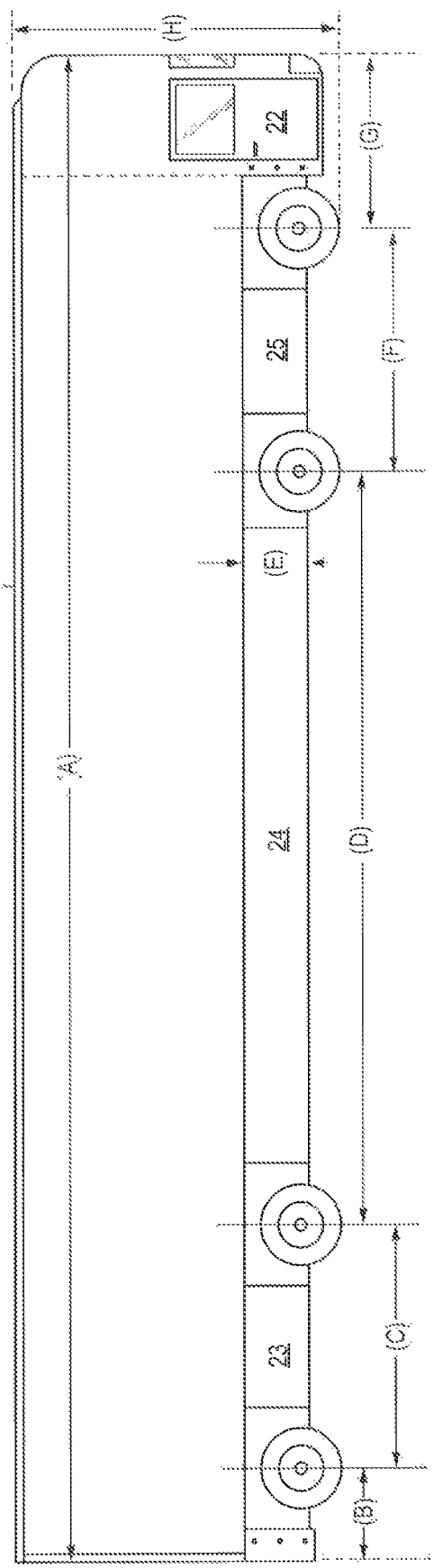
FIG. 4 is a right-side view of the vehicle shown in FIG. 1.

FIG. 4 shows the right side of the vehicle, including three undermount spaces 23, 24 and 25, which may be designed to be exactly the same size as undermount spaces 13, 14 and 15. Undermount spaces 23, 24 and 25 may contain ESDS components that perform identical functions to the functions performed with the ESDS components housed in undermount spaces 13, 14 and 15, as earlier described.

Referring now to FIG. 4, curbside access door 22 is located on the opposite side of access door 9 in the operator's compartment. With the elimination of engines, transmissions and driveshafts, and with direct access to the frame 'C' channels, such access door is preferably designed for quick and secure access to all hard-wired and secured electrical and pneumatic system componentry for all propulsion, non-propulsion, communication, and Level 5 system controls, all hard-wired and plumbed through the frame 'C' channels and housed or controlled from the operator's compartment. Access door 22 may also provide space for a temporary passenger seat.

Still referring to FIG. 4, exemplary exterior dimensions for the illustrated non-articulating vehicle of the present invention include: (A): 62 feet; (B): 44 inches; (C): 10 feet; (D): 31 feet; (E): 35 inches; (F): 120 inches; (G): 7 feet 4 inches; and (H): 13 feet 6 inches.

Figure 5:
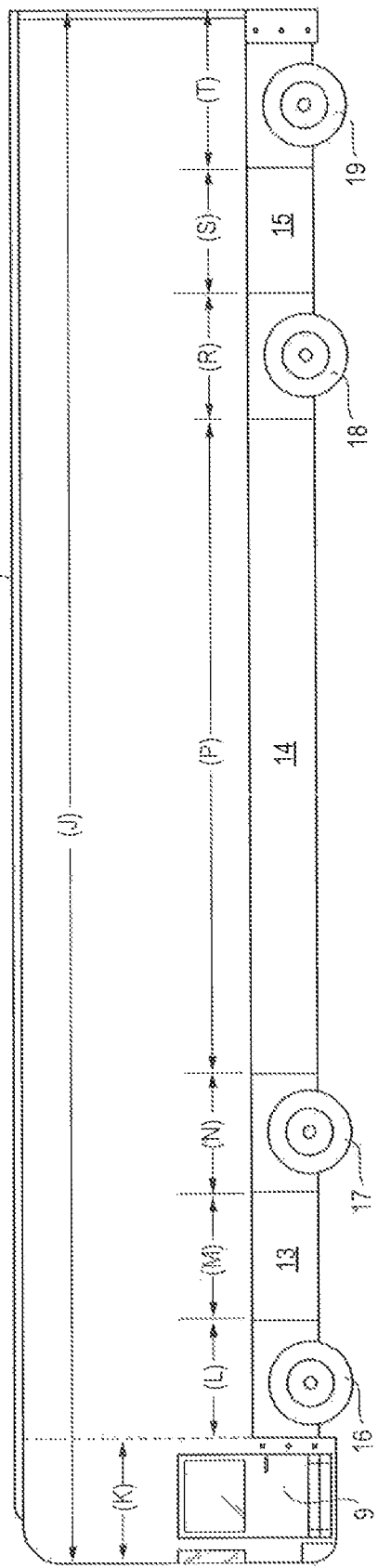
FIG. 5 is a left-side view of the vehicle shown in FIG. 1.

Referring now to FIG. 5, exemplary exterior dimensions for the non-articulating vehicle of the present invention include: (J): 62 feet; (K): 60 inches; (L): 56-inches; (M): 60 inches; (N): 56 inches; (P): 27 feet; (R): 56 inches; (S): 60 inches and (T): 72 inches.

Figure 6:
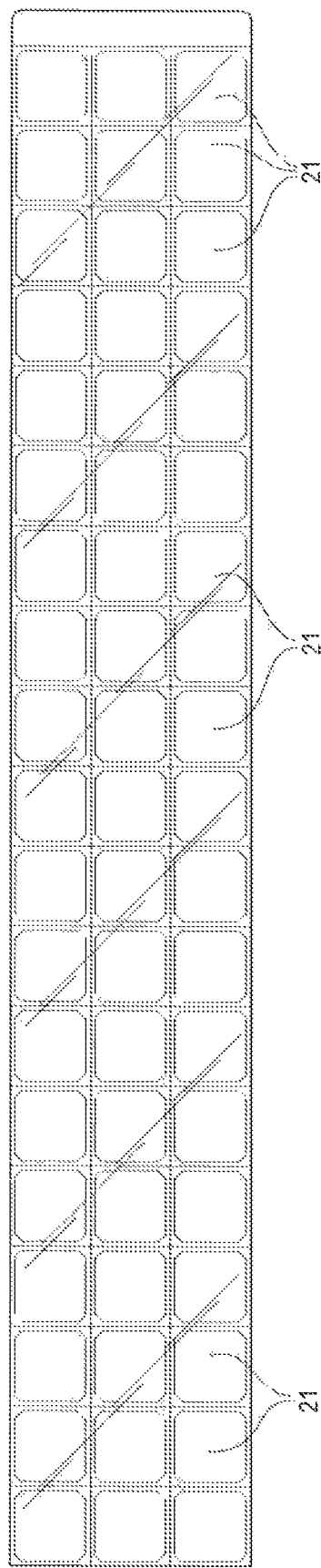
FIG. 6 is a top view of the vehicle shown in FIG. 1.

Referring to FIG. 6, solar panels 21 may be installed on the top of the entire length of the vehicle, except for two feet at the front of the vehicle where the roof is contoured into an aerodynamically-shaped section. The solar panels may be designed to supply electrical power to the front-mounted cargo refrigeration/heating system 4 (see FIGS. 1 and 8). If the vehicle is not equipped with a cargo refrigeration/heating system, the energy supplied from the roof-mounted solar panels may provide direct and back-up power for the ESDS in undermount spaces 13 and 25.

Figure 7:
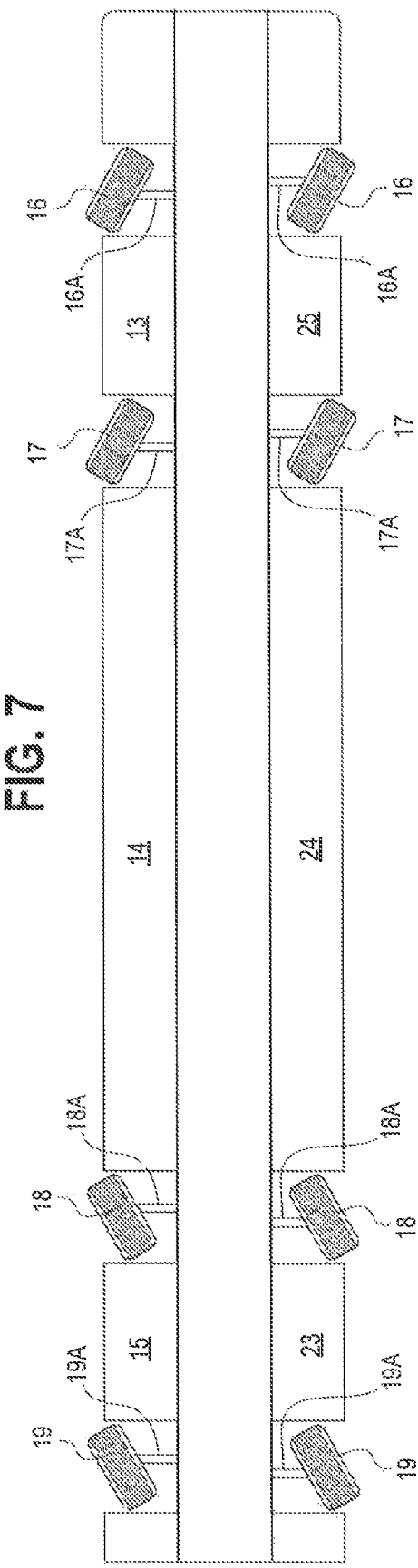
FIG. 7 is a bottom view of the vehicle shown in FIG. 1.

FIG. 7 shows the underside of the vehicle, identifying all eight tire and wheel positions, and all four axle positions (axles 16A-19A, tires 16-19), during execution of a right turn. FIG. 7 also shows the bottoms of the undermount spaces (13-15, 23-25) identified earlier (see FIGS. 1,4 and 5).

FIG. 8 shows the front of the vehicle. FIG. 8 also illustrates the front of the three-axle and two-axle configurations of the present invention. FIG. 8 also shows the exterior width at the front of the vehicles, (Y), which in the preferred example is 8 feet, 6 inches.

FIG. 9 shows the rear of the vehicle. FIG. 9 also illustrates the rear of the three-axle and two-axle configurations of the present invention. FIG. 9 also shows the exterior width at the rear of the vehicle, (Z), which in the preferred example is 8 feet, 6 inches.

The vertical dotted line at FIGS. 1, 2, 3, 4, 5, 10 and 11 is the location of an interior bulkhead that separates the operator's compartment and the front-mounted cargo heating/refrigeration system from the cargo body FIG. 10 is an exemplary alternative example of the present invention, and illustrates a three-axle 60,000 lb. GVWR commercial vehicle designed with a single forward non-driven steer axle, and two rear-driven steer axles, designed as an alternative to three- and four-axle articulating combination vehicles. This alternative example is described in more detail below.

Figure 11:
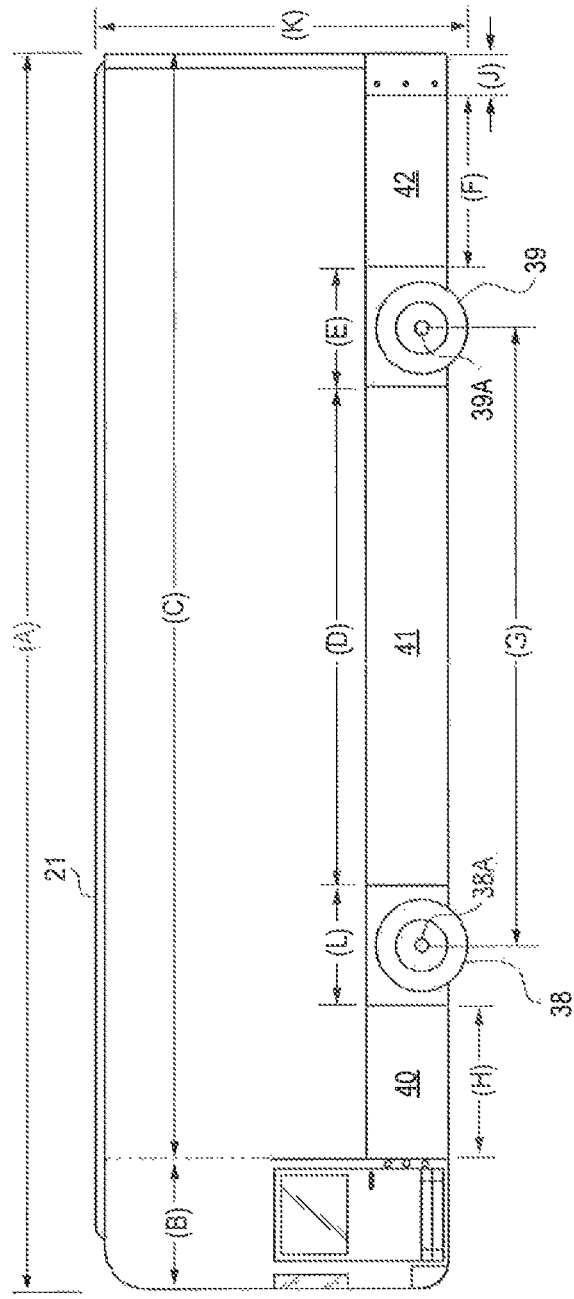
FIG. 11 is a left-side view of the second exemplary alternative example of the present invention, a commercial vehicle with a two-axle, 40,000-lb. GVWR.

FIG. 11 is another exemplary alternative example of the present invention, illustrating a two-axle 40,000 lb. GVWR commercial vehicle, designed with a forward non-driven steer axle and a rear-driven steer axle, as an alternative to two-axle straight trucks. This alternative example is also described in more detail below.

Throughout this disclosure, the propulsion system specified is battery-electric based on the premise that automotive batteries will continue to become lighter, more powerful and longer-lasting, and that remote (wireless) charging technologies will be developed; however, should such a premise prove premature, persons of ordinary skill in this art will understand and appreciate that other propulsion systems, such as hydrogen-electric, may alternatively be used on the three-axle and four-axle configurations as there is more than enough space under the cargo body and between the axles, for all required hydrogen-electric systems, including pressure tanks or insulated tanks for the hydrogen in gas or liquid form (liquid form to be the most likely form of hydrogen rather than gas) and hydrogen fuel cells and related componentry. The space for such tanks on both three-axle and four-axle configurations may be no less than twice the space that would be available on two-axle or three-axle tractors used in current articulating combination vehicles; additionally, for extended range, supplemental tanks for liquid hydrogen may be mounted inside the frame rails as there is ample space, with no restrictions other than well-spaced frame crossmembers.

Propulsion systems for the 2-axle configuration are preferably battery-electric, as commercial vehicles of this size are generally used in urban and regional areas, wholly inside an operating radius of generally not more than 250 miles.

Propulsion systems for the three-axle configuration may be either battery-electric or hydrogen electric as the longer wheelbase version of this configuration provides enough undermount space and cargo space to be adaptable to longer distance operating areas.

Preferably, the commercial vehicle of the present invention in the 4-axle, 80,000 lb. GVWR configuration may have the following design features and benefits:

1) A zero-carbon-emission, fully-electric powertrain, consisting of a vehicle designed to provide an alternative to articulating-configured commercial vehicles, in a 4-axle configuration that can be built with overall body lengths from a minimum of 62-feet to a maximum of 72-feet.

2) designed for immediate integration into Level 5 Autonomous Vehicle Architecture with the electrical and compressed air connectivity advantages of a single non-articulating design;

3) designed to provide increased volume capacity with (e.g.) a minimum 57-feet of cargo body space versus 53-feet in trailer cargo body space in common use today, and increased load capacity by reducing the unloaded weight through the elimination of the tractor, fifth wheel, upper (trailer) coupler, landing gear and the fifth axle;

4) designed with all four axles functioning as steer axles, enabling the present invention to be more maneuverable and more stable, with less body roll on horizontal curves, using 'in-phase' four-axle steering where at highway speeds all eight wheels steer in the same direction, to execute quicker steering response, to execute faster and safer lane changes, to maintain perfect in-line tracking and to execute turns inside a narrower wheel path;

5) designed to be easily reconfigured into a longer configuration without changing the location of the four axles;

6) designed to eliminate the trailer trailing problems inherent in articulating combination vehicles by eliminating the hinge point;

7) designed to be more stable with a lower center-of-gravity than traditional tractor-trailer combination vehicles having a propulsion system only in the tractor, thereby having little relative mass under the cargo body to offset the weight of the cargo in the trailer section, versus the present invention where the ESDS components are located at the center of the vehicle, directly under the cargo body, whereby this lower center of gravity and absence of a pivot point insures that vehicle roll-overs are improbable and jackknifes impossible;

8) designed with electric brake systems on all wheels (brake by wire) with either dual-disc or wedge brake systems, to insure almost perfect braking balance among all eight wheel positions, which may shorten stopping distances relative to comparable 80,000 lb. GVWR combination vehicles with air-brake systems in common use today, where such combination vehicles have inherent delays in trailer brake actuation, leading to longer stopping distances, and unsafe trailer-tracking during a panic braking, with the inherent potential for jackknifes and roll-overs;

9) designed to maximize payloads where all four (4) axles have weight equalizing suspensions systems, with all axles placed directly under the cargo body, unlike traditional articulating vehicles where steer axle loads often have inherent limits to the amount of weight such axles may carry;

10) designed to achieve more efficient energy use for greater operating range with: a) safer, more secure, larger and more accessible design for both compressed air energy and electrical energy production, storage and distribution components (ESDS); b) ESDS components sized for the ability to function with a dual-drive system where only one drive axle is engaged under normal driving conditions; c) 480 sq. ft. of solar panels on the roof of the vehicle; d) better body aerodynamics; e) no tractor-trailer gap increasing aerodynamic drag; f) and reduced rolling resistance with 8 wide-based single tires engaged versus the 10-18 tires engaged on 80,000 lb. GVWR combination vehicles in common use today; and g) regenerative braking on all wheels;

11) designed to be durable, inexpensive to build, easy to maintain with safe and direct access to all ESDS components, one less axle, at least two less tires and wheels, no trailer landing gear, no trailer upper-coupler, no separate cab components such as fifth wheel, trailer pick-up rails or exposed air and electrical hoses and wires, elimination and replacement of all expensive and heavy hydraulic pumps, and related cylinders, pistons, pressure tanks and high pressure lines with low maintenance and long-lasting electrical motors for all steering, braking and cargo lift systems;

12) designed to readily reconfigure and adapt to two smaller sizes: 1) a 2-axle 40,000 lb. GVWR vehicle that may accommodate an overall body length from 41-50 feet, and 2) a 3-axle 60,000 lb. GVWR vehicle that may accommodate an overall body length from 48-60 feet, with the two-axle version driven exclusively with battery-electric power and the three-axle version driven with either battery-electric or hydrogen-electric propulsion;

13) designed so that both the two-axle and three-axle exemplary alternative examples of the preferred example of the present invention may have all the design benefits in efficiency, safety and productivity as are present in the four-axle 80,000 lb. GVWR configuration;

14) designed with multiple and integrated battery charging ports; and 15) designed for safer operator entrance and exit at the operator's compartment.

The vehicle frame may be a continuous structural aluminum 'C' channel, with the size and thickness of the web and flange of such 'C' channel determined by the weight of the battery packs or hydrogen tanks and fuel cells. The vehicle frame width may be 30 inches for its entire length, while the vehicle frame height may be 44½ inches for its entire length.

The frame overall width of current combination vehicle tractors is 34 inches as there is a large internal combustion engine that must be safely cradled. The advantage of a narrow frame is more undermount space for ESDS componentry. Suspension systems may be modified to support such narrower frame as pneumatic air spring housings may be designed to be situated fore and aft of the axle positions.

Frame crossmembers may be structural aluminum 'I' beams, spaced to support the weight of the ESDS in all six undermount spaces, with end-plates welded to the web and flange of the 'I' beams; such 'I' beam end plates may then be bolted through the frame's 'C' channel web. Round openings with hard rubber inserts may be strategically placed in the web of the I-beams for the routing of compressed air lines, and low and high-voltage electric wire distribution; additionally, frame cross-members may also support interior frame-mounted liquid hydrogen tanks and interior frame-mounted compressed air tanks.

Eight Goodyear low rolling resistance wide-base tires may be used, each with a 17.5-inch width, a 39.2-inch diameter, and an 18.1-inch loaded radius, with each tire rated for 10,200 lbs. at 120 psi. Each tire may have integral air pressure sensors with a directly-plumbed, automatic air pressure management system. The horizontal tire clearance with the 30-inch frame width may be no less than 7.5 inches horizontally, when measured with the tire turned at 90-degrees to the frame, and no less than 6.0 inches horizontally, when measured to the corner of the tire at a 45-degree turn.

Two forward steer axles, each with a 102-inch wheel track, with a deep turning radius afforded by the narrow frame and the 39.2-inch diameter tires, may be used. Additionally, two rear electric-driven and steerable axles, each with a 102-inch wheel track, and having a deep turning radius afforded by the narrow frame width and the 39.2-inch diameter tires, may also be used.

Acknowledging that tractor-trailer combinations trailer axles follow, but not directly, the vehicle of the present invention, having all-wheel steering, with the autonomous systems automatically engaging "counter-phase" steering, may function with a safer wheel path when turning at low speeds, and may function with safer tracking at highway speeds with autonomous systems automatically engaging "in-phase" steering. Such all-wheel steering features may clearly improve vehicle stability and improve highway safety, and are features and benefits unavailable with trailer-tractor combination vehicles.

In order to achieve an 80,000-pound GVWR, current federal bridge and length laws require there to be a minimum of 51-feet between the front and rear axle hubs, and a minimum of 10 feet between the hubs of the two front axles and 10 feet between the hubs of the two rear axles.

As further discussed below, designs of the present invention for an 80,000-pound GVWR are not in strict compliance with current federal law, as the fifth axle is removed. With a 10-foot spread between the hubs of the steer axles and the hubs of the drive axles, the useable and legal-loaded axle weights for each of the four axles is 20,000 pounds. Current Federal Weight Rules would restrict the four-axle configuration of the present invention to a 76,000 lb. GVWR; however, it would still be an unlawful vehicle to operate because of its length.

Vehicles of the present invention preferably may incorporate electric braking systems, known as brake-by-wire, for all eight (8) wheel positions, using either dual disc or wedge brake systems with digitally controlled axle centric components.

Brake-by-wire systems are designed for brake energy regeneration and are designed to more quickly and evenly deliver braking forces, which may improve vehicle control and stability and deliver much shorter stopping distances. As electronic signals to all brake systems must be failsafe, the inherent problems of tractor-trailer coupling become evident (as earlier identified by the Society of Automotive Engineers and other transportation industry experts); additionally, the vehicle of the present invention may have regenerative braking at eight wheels (versus six on five-axle tractor-trailer configurations), providing more energy efficiencies at levels not available with combination vehicles in common use today.

Referring to left-side and right-side side views in FIGS. 4 and 5, respectively, two identical undermount spaces 14 and 24 may be provided, each with exemplary outside dimensions of 27-feet long, 35 inches high and 34 inches deep, and with each such space containing the ESDS components required to power the vehicle, whether the propulsion system is battery-electric or hydrogen-electric. Four identical 5-foot undermount spaces 13, 15, 23 and 25 may also be provided, each 34-inches deep, and each containing all non-propulsion ESDS for pneumatic system components and battery-electric components.

Where appropriate, all ESDS components, primarily battery packs and fuel cells, may be encased in secure and weatherproof enclosures in the spaces identified. Components not encased in such spaces are preferably securely mounted inside such spaces for safe and quick access for inspection and service. All secure enclosures may be through-bolted to the web of the 'C' channel, and may be further secured and supported by the 'I' beam cross-members, enabling the vehicle of the present invention to operate with substantially larger and more powerful ESDS componentry than may be available on tractors used in combination vehicles in common use today.

All undermount spaces, whether housing secure and weatherproof enclosures for ESDS components, or components not requiring any such enclosures, may have access doors fully covering the front openings of such spaces. Spaces with no inside enclosures may have enclosed bottoms and sides made of structural aluminum plates preventing moisture, dirt, salt, ice or any other foreign materials from contaminating or damaging all such undermount spaces.

By having the two very large undermount spaces designed specifically for vehicle propulsion, and with the four smaller undermount spaces designed specifically to supply energy for all other non-propulsion requirements of the vehicle, the clear and the very significant advantage of this non-articulating design, in all design configurations, is larger, safer, more secure and more accessible space for battery packs and related componentry, or hydrogen-electric fuel cells, hydrogen fuel tanks, compressed or liquid hydrogen, and related componentry, all dedicated to the propulsion system. Further, all non-propulsion power demands may be managed by the ESDS componentry safely and securely housed in the four, equally accessible, undermount spaces, enabling this truck, in the 60,000 lb. GVWR and 80,000 lb. GVWR configurations, to efficiently function with ESDS capacity that may be 3-4 times the size of ESDS componentry in conventional tractor-trailer configurations, in either battery-electric or hydrogen-electric configurations. All of this enables this vehicle design, in either the three- or four-axle configuration, to efficiently operate with a dual-drive system, adding to the functionality of this design in providing greater operating range than comparable tractor-trailer combination vehicles.

Figure 12:
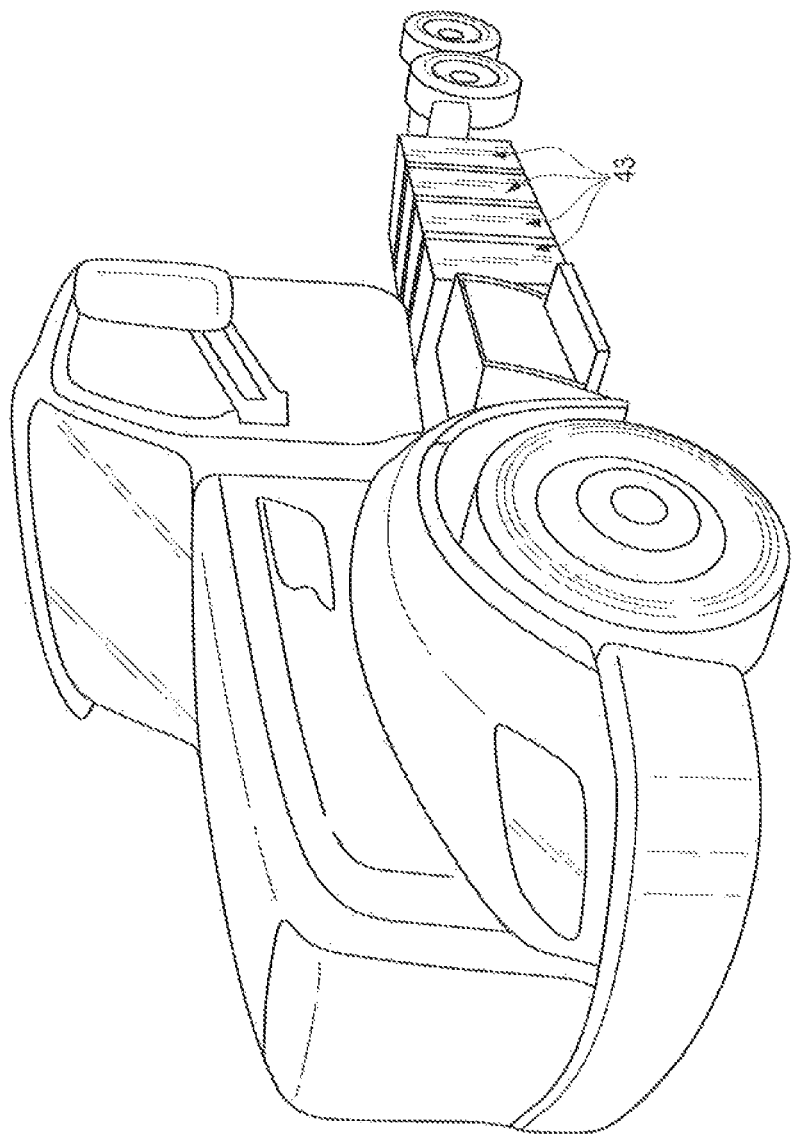
FIGS. 12-15 are front, side and rear perspective view of various prior art cabs.
Figure 13:
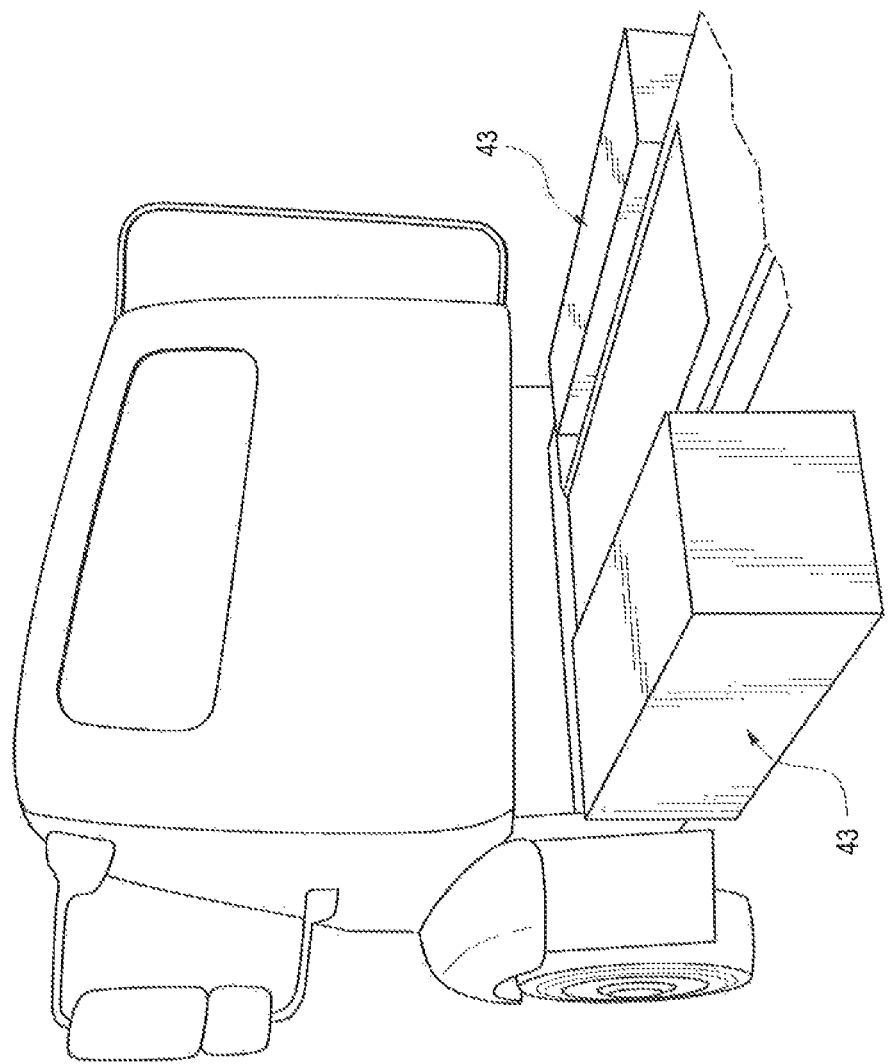

Referring to FIGS. 12 AND 13 (copied from two photographs of actual, conventional, battery-electric powered three-axle tractors), boxes 43 mounted onto the outside of the frame between the front and rear axles, clearly show the very limited space available for installation of battery packs and related ESDS componentry on a typical three-axle tractor. There is also limited space under the cab of such tractor for any non-propulsion ESDS componentry, and such space would be difficult to access for maintenance and inspection.

If the preferred embodiment of the present invention is designed for extended range, each of the rear driven axles may be independently driven by a single electric motor directly attached to the differential of each rear axle, and each motor may be driven by one of the two ESDS housed in undermount spaces 14 and 24. Inverters may be directly attached to the electric motors, which are in turn directly attached to the drive axle differentials, adding to the simplicity of the design, and reducing the cost to build.

When operating under normal conditions, the two ESDS in undermount spaces 14 and 24 may power the drive axles independently, and power can be redirected in the event one of the drive axle differentials fails; additionally, both drive axles may be designed to instantly and automatically engage as power requirements change, such as on a steep vertical grade. Also, with sudden or unexpected changes to weather or road conditions, a simultaneous engagement of both drive axles may be made manually by the vehicle operator.

Extending range is the 'holy-grail' of electric propulsion. In addition to larger and more functional ESDS componentry, in either batter-electric or hydrogen-electric configurations, specific design components of the present invention may contribute to extending range. The design is lightweight, all eight tires have low rolling resistance, the electric brakes create regenerative electricity back into the ESDS, the body is aerodynamic, 480 square feet of roof mounted solar panels will provide a significant energy boost, and even the electric rear cargo lift, undermount, or frame-mounted rail-lift, will add regenerative electricity back into the ESDS when the lift is lowered while under load.

In the hydrogen-electric configuration there is at least four times the space for liquid hydrogen or compressed hydrogen gas tanks, both inside and outside the frame rails, as compared to the typical tractor-trailer combination, substantially extending range. Even the three axle 60,000 lb. GVWR of the present invention, if powered by hydrogen-electric, may have far greater range than any tractor trailer configuration powered by hydrogen-electric.

Additionally, as with battery-electric componentry, hydrogen-electric componentry, by reason of functionality, must be installed only on tractors and not on trailers, and other than the hydrogen tanks themselves, which would most likely be placed outside the tractor frame rails, between the steer axle and drive axle(s), much of the ESDS componentry must be placed onto the back of the cab, which creates several potential problems: 1) difficult access for maintenance and service; 2) unsafe access as the height of some components can be as high as 12 feet above ground level; 3) expensive to construct as all of these components must be secured to the back of the cab with a substantially sized and sturdily constructed rack as the cab itself is generally built without a heavily reinforced frame behind the sheet metal; 4: clearly a top-heavy design adding to overall instability of the combination vehicle; and 5) as jackknife accidents are not uncommon with articulating tractors and trailers, an event of even a minor jackknife incident may subject this hydrogen ESDS componentry to serious damage.

Figure 14:
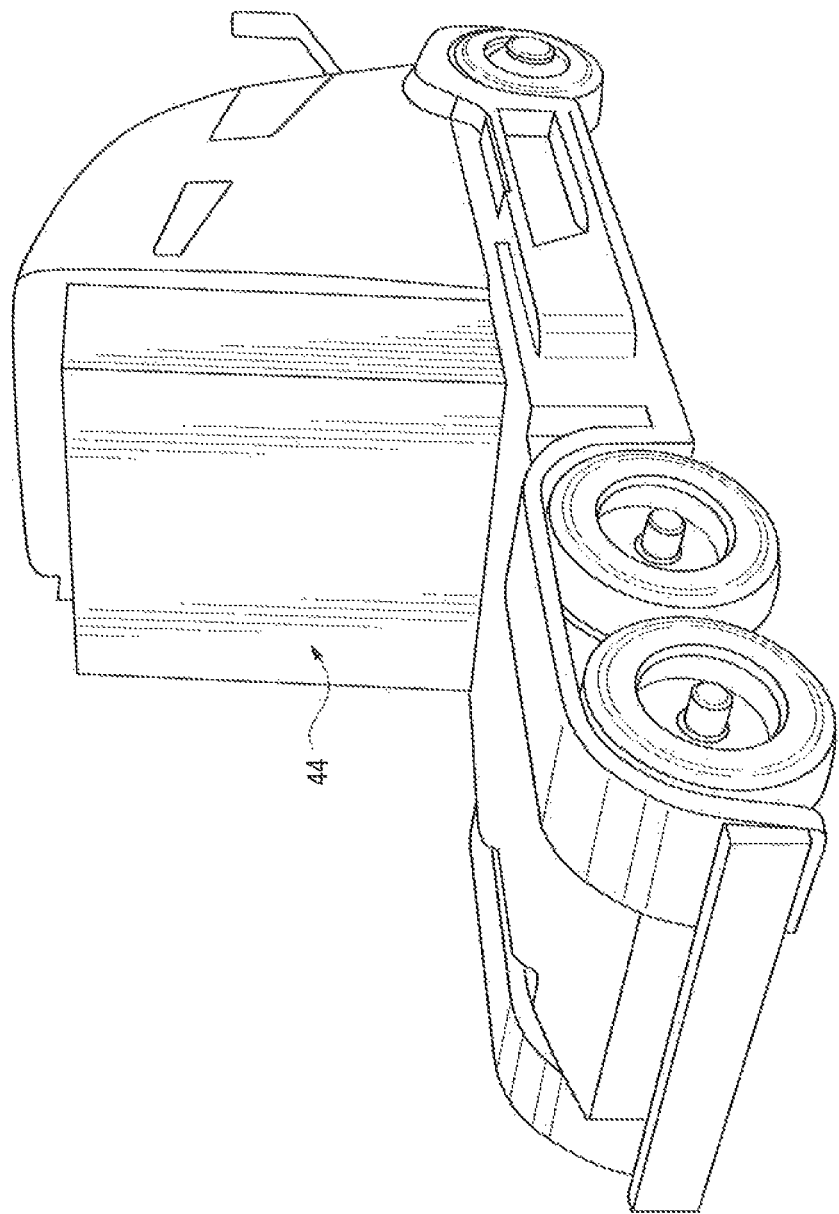
Figure 15:
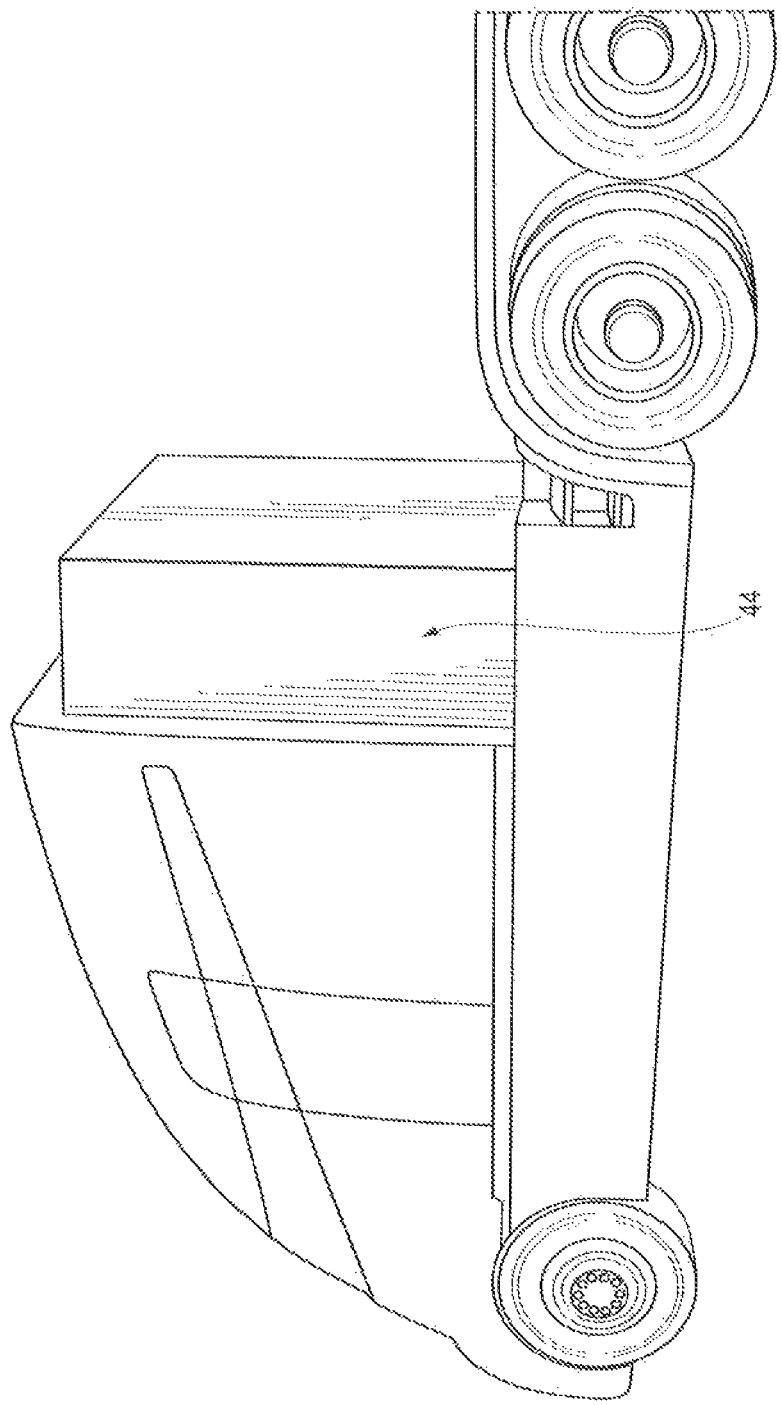

To underscore the potential (and real) problems outlined in the above paragraph, and referring now to FIG. 14, this drawing from a photograph of a conventional, hydrogen-powered Nikola-1 Tractor, illustrating how much of the ESDS componentry 44 is "stacked" onto the back of the cab and above the frame rails. Similarly, referring to FIG. 15, a drawing from a photograph of a U.S. Express hydrogen-electric-powered tractor, this again shows a significant amount of ESDS componentry 44 stacked high on the back of the tractor and above the frame rails, completely exposed to jackknife damage that may occur when combination vehicle tractors are exposed to the many conditions under which they may operate. Those of ordinary skill in the art will appreciate that, with regard to the tractors shown in FIGS. 14 and 15, there is extensive and complex hydrogen-electric componentry that may be contained inside the large behind-the-cab compartments on tractors such as those shown there, clearly showing how dangerous it can be when such componentry is fitted onto and into the type and size of commercial tractors in common use today.

Preferably, Tier I Suppliers are used for such items as axles, differentials, suspension systems, cargo cooling and brakes (e.g., Hendrickson for suspension; Meritor or Dana for axles, steering and differentials; Bendix for electronic brake systems; Carrier Transicold for cargo heating and refrigeration; and Aurora or Tu-Simple Systems for Level 5 Automation).

Unmatched by any hydrogen-electric or battery-electric-powered commercial vehicle today, and critically important for market penetration based solely upon the operating range, is the design and size of all the ESDS components of the preferred example of the present invention. With two primary 27-foot long undermount spaces 14 and 24 for propulsion, and with four secondary 5-foot long undermount spaces 13, 15, 23 and 25, for all non-propulsion requirements, there is abundant structurally-sound space, readily and safely accessible, both inside and outside the frame rails, enabling the four-axle configuration of the present invention to have an operating range unsurpassed by any 80,000 lb. GVWR capacity vehicle powered by either hydrogen-electric or battery-electric propulsion.

In addition to the ESDS components housed in undermount spaces 13, 15, 23 and 25, supplying power to non-propulsion componentry, these four spaces may also provide direct connectivity for Level 5 Autonomous Vehicle Systems controlling steering braking, suspension, tire pressure, plus high and low voltage connectivity for camera and radar systems, telematics and communications, all sealed and hard wired through these four undermount spaces, connecting all of the truck's systems, controls and data transmission to the operator's compartment 3.

Each of the four undermount spaces, 13, 15, 23 and 25, may contain an electric high volume air compressor mounted outside the frame rail, and a pressurized large capacity supply air tank and a smaller pressurized service tank, both of which are mounted inside the frame rails adjacent to the air compressors, designed to provide compressed air energy to the pneumatic suspension systems on all axles, and for tire air pressure management.

With four compressed air systems in the four undermount spaces, the design of such system may use one such system between undermount spaces 15 and 23 (FIG. 7), as the primary system for the two rear axles, and the other undermount space may be the secondary, or back-up system, for the two rear axles. Undermount spaces 13 and 25 may also have the same functionality with respect to the compressed air system required for the two front axles, one for the primary system, and the other for the secondary, or back-up, system.

In addition to the load-leveling functions, the pneumatic suspension systems may control ride height, and once ride height is set on such suspension systems the control of such height may be automatically maintained, with no appreciable deviation from such height, whether the vehicle is empty or loaded to the maximum allowable weight.

This ride-height control function is very important as the vertical tire clearances must be maintained for safe and unimpeded steering at all eight (8) wheel positions. In the event there is any malfunction in any of the primary compressed air systems, the controllers for ride height and load-leveling suspension systems may immediately switch to the reserve system to maintain the correct ride height and load-leveling functions. Any failure of any reserve system to maintain ride-height or load leveling may result in the autonomous system controllers engaging the air suspension lock, described in the following paragraph, preventing all eight wheels from executing turns other than what is required to move the vehicle from the roadway, and then to slowly and safely stop the vehicle.

As referred to in the above paragraph, in the event the ride-height system or load-leveling system functionality fails because of the loss of air pressure, from both primary and reserve air compression systems, (a very unlikely situation), or even if a pneumatic air spring housing ruptured, there may be a mechanical lock that automatically engages should the vehicle frame drop more than what is required to maintain tire clearances. This technology already exists in the form of a 'Dock Lock' on certain air ride suspension systems (first designed to keep trailers from 'dropping' at docks under the weight of loaded fork lift trucks), where a metal plate, or 'stop', is built into the pneumatic air spring housing that maintains the critical minimum height of the vehicle and stops the vehicle from dropping below the critical point where tire clearances may be affected. The 'Dock Lock' feature was first used to enable a vehicle operator when docking to release all air from all air springs to let the vehicle settle on the 'stops' inside the air spring housing for a more stable rear threshold while the vehicle is being loaded and unloaded.

The vehicle suspension systems are monitored and controlled by the autonomous systems of the vehicle. The operator may receive continuous air pressure readings, would be alerted should there be a sudden drop in air pressure anywhere in the system, and would be alerted should the ride-height of the vehicle show any unexpected change, or should the suspension height 'lock' be engaged.

These pneumatic systems with the autonomous system controllers also monitor and maintain the tire air pressure for all eight tires, maintaining all tires at the correct air pressure to assure the safe operation of the vehicle with respect to handling, braking and tracking; additionally, underinflated tires also increase rolling resistance and as such significantly increase energy use.

The five-foot long by eight-and-one-half-foot wide operator's compartment 3 (FIG. 1, exemplary dimensions), may consist of a reinforced steel enclosure, with side, front, and top air bag systems, and may have a full-width windshield and multiple camera and radar systems to monitor the entire perimeter of the vehicle, overhead clearances, the underside of the vehicle, and the interior cargo space.

Access to HVAC, camera, radar, telematics, lighting, communication and all other controls for autonomous systems may be provided at the front of the vehicle, via access panel 20 (FIGS. 1, 8) and/or access door 22 (FIG. 4).

All exposed high and low voltage electrical connections to cameras, radar, telematics, communication, lighting, steering and braking controllers and air compressors, and all other components of the vehicle's autonomous systems, may be hard-wired and secured in sealed, heated, reinforced and protected conduits secured inside the 'C' channels and routed through openings in the frame cross-members.

High pressure air lines for pneumatic weight-leveling and ride-height suspension system components, and for automatic tire inflation systems, may be encased in PVC material and securely routed from the (e.g.) four electric air compressors to the (e.g.) eight pressurized air tanks inside the frame 'C' channels and through the frame 'I' beam crossmembers, and directly to the systems' controllers for air pressure management for suspension systems and tires.

Passenger seating may be designed to be easily removeable. Referring to FIGS. 4 and 5, two access portals, doors 9 and 22 to the center console, are shown, where given the elimination of drive shafts, there is much available space inside operator's compartment 3, directly connected to the frame 'C' channels, for access to the hard-wired and secured electrical and pneumatic systems of all propulsion, non-propulsion, communication and autonomous system components.

Preferably, the vehicle's shape is aerodynamic, with a rounded front radius at the sides and roof, and an aerodynamic front bumper, with no tractor-trailer gap. All of the six undermount spaces may be enclosed at the sides with smooth flat aluminum plates, at the front with smooth aluminum access doors, and the underside, where necessary, may be enclosed with structural aluminum plates, giving the vehicle body complete and effective 'skirting' for efficient air-flow. If the vehicle's primary operating range is local and regional (e.g., return to home domicile every night), the use of expensive aerodynamic add-on devices, such as 'trailer-tails' or wheel covers may not be practical.

Cameras, radar and telematics components 1, 10 and 30 (see FIGS. 1, 8 and 9), all essential for autonomous operations, may be mounted at the front of the operator's compartment, and on the front, and rear of each side of the vehicle, and in the rear frame and header. All such components may be enclosed in heated, sealed, reinforced and protected spaces, and all may be hard-wired.

Sixteen inches of depth (e.g.) is available at the fantail of the vehicle for strong underride protection, affording a better design than what is typical on most combination vehicle trailers. Additionally, if the vehicle's frame is extended to the rear of the body, the strength of such underride protection may assure that no automobile could breach such a barrier. Except for the deep underride protection, and protective and heated compartments for camera, telematics and radar systems, the rear of the vehicle may be identical to existing combination vehicle trailers, refrigerated or dry, and the rear frame depth for roll-up or swing doors may be identical to existing combination vehicle trailer dimensions.

By eliminating the monocoque design of the traditional combination vehicle trailer the cargo body of the vehicle of the present invention may be frame-supported. The cargo body floor, made from hardwood, steel or aluminum, may be 48-inches high, from the bulkhead to the rear door opening. If hardwood, the floor may be 1.5-inches thick for the full length of the cargo body, screwed directly into the under-body crossmembers, and such hardwood floor, as an option, may be modified to a shallower thickness of 1.25-inches, either at the full width, or at the middle 4 feet, and such modified sections of floor may be covered with % (0.25) inch diamond plate aluminum sheets when interior traction is essential, or when weight is not critical, or when additional floor support is required.

For the first (e.g.) 24-inches of the floor of cargo body 2, if such floor material is hardwood, a % (0.25) inch full-width threshold plate, made of diamond plated steel, level with the top of the hardwood, may be secured to the wood floor and under-body cross-members to prevent damage to the floor from dock-leveling plates used at most distribution centers.

The sides of the cargo body may have LED marker lights, reflective tape, and at the front and rear sides of the cargo body, and at the upper corners of the rear door frame, there may be LED turn indicators.

The cargo body floor may be supported by 6-inch by 2-inch structural aluminum 'hat-section' crossmembers mounted on 15-inch centers, with welded end plates that bolt or rivet to a 10-inch extruded aluminum lower rail which may have a ½ (0.5) inch lower flange that turns into the underside of the 'hat-section' cross-members.

As with typical high way trailer construction, the lower rail may be riveted or bolted through the end plates of the floor cross-members, and riveted to the side posts of the trailer body. Additionally, if the cargo body side panels are composite plates, the stiffeners used for such side posts may be riveted to the lower rail also, and the lower rail may be increased in thickness to add sidewall strength at the base, and increased in height to between 20-26 inches, and may be integrated into the interior cargo body scuff-liner.

Preferably, all design configurations of the vehicle of the present invention have all-wheel steering but have no wheel wells to house steer wheels. To insure acceptable vertical tires clearances, the 'hat-section' cross-member designed to be directly above every tire may be removed, for the full width of the body, and the two adjacent 'hat section' crossmembers may be modified and reduced to ½ inches, with identical 6-inch width, and installed for the full width of the body. Placed upon the top and through-bolted to the two modified 'hat-section' crossmembers may be a %-inch thick structural aluminum plate, running the full width of the body, 36-inches long, and centered over every tire, enabling 6.8-inches of vertical tire clearance at all eight tires, using an adjusted tire diameter of 38.7 inches (39.2 inches minus 0.5 inches for the deflection of the bottom tire radius from the empty weight of the vehicle).

Additionally, at every tire location where the single 'hat-section' crossmember is removed, and where the two adjacent 'hat-section crossmembers are modified, the lower rail may have a cut-out approximately 22-inches long and 2-inches high, bordered at the bottom by the ½-inch flange at the base of the lower rail. The tire clearance of 6.8 inches includes clearances of the ½ (0.5)-inch lower rail flange.

Four (4) 6×2 inch 'hat section' cross-members may be installed at the rear threshold, all on 7½ inch centers, under the rear threshold plate, to prevent floor deflection during cargo loading and unloading.

The cargo body of the present invention, in all design configurations, may have comparable specifications to conventional trailers of articulating combination vehicles. Cargo body side posts or sidewall stiffeners may be riveted to the lower rail. Cargo body sidewall panels may be made of aluminum sheet, aluminum plate (highly specialized operations) or composite materials. If the cargo body sidewalls are made of composite material, an aluminum interior scuff-liner may be integrated with the aluminum lower rail, as noted above. Other components typical on trailers, such as cargo tie-down bull-rings in floors, slotted side posts for cargo securement, shallow aluminum roof bows, interior LED dome lights, sidewall skylights, hardwood scuff-liners, double decking systems and reinforced bulkheads may all be easily incorporated into the cargo body design.

The vehicle cargo body may be equipped with a direct-wired electric rear-frame mounted cargo rail-lift, and a direct-wired electric roll-up door, supported by the ESDS componentry in undermount spaces 15 and 23 (see FIG. 7). The electric cargo rail-lift may have the capacity of lifting 5,000 lbs., and may be designed to supply regenerative electrical power back to the ESDS in undermount spaces 15 and 23, while being lowered while loaded. In a heavy-duty cycle, with cargo moving from vehicle floor to the ground, the electric rail-lift that may be used on the present invention may produce more electricity than what is consumed while performing such work.

In the four-axle configuration, where an additional five feet of undermount space may be added behind rear axle 19, as an alternative to the rear frame mounted rail-lift an undermount glide-under or tuck-a-way electric cargo lifting device may be installed in such additional undermount space, and may have the same energy regeneration as the rear frame-mounted cargo rail-lift identified in the immediately preceding paragraph.

As the cargo body is frame-mounted, side-doors of any size may be easily and inexpensively added without the need for extensive and costly door frame reinforcement, as is the case with monocoque-constructed combination vehicle trailers. The cargo body may also be easily configured as an open-top trailer, for overhead loading, or as a flat-bed for side loading, as the cargo body is built directly onto the vehicle's frame, much like the design of flatbed and open-top trailer frames.

If commodities carried are perishable, the cargo body may be designed with identical specifications as a refrigerated combination vehicle trailer with respect to insulation, floor material, sidewall material and temperature management.

With a 30-inch frame width, Goodyear wide-based tires, with a 17.5-inch width and a static radius of 19.6-inches, a loaded radius of 18.1-inches, on a 102-inch wheel track, steering geometry of the present invention compares favorably to Class 8 tractors with a 34-inch frame (necessarily wider because such frames must support a separate cab, fifth wheel, diesel engine and transmission), 10.8-inch wide 11×22.5 tires of 41-inch diameters, with a static radius of 20.5 inches, loaded radius of 18.7-inches and 96-inch wheel tracking.

All four steer axles require individual wheel controllers and actuators using steer-by-wire technology, which is essential for the vehicle to function. Steering technology systems, such as Enhanced GPS Navigation Systems, Critical Path Control Algorithms, Active Kinematics Controls and Geometry-Based Path Tracking Algorithms, are the technologies used in the development of Level 5 autonomous systems and preferably incorporated into the design of all three (3) configurations.

All-wheel steering has already been developed by several OEM's and Tier 1 Suppliers. Managing the all-wheel steering functionality for all eight wheels, using the technologies referenced above, requires the camera and radar systems developed for autonomous systems of this vehicle to be integrated with the controllers and actuators at all eight (8) wheel positions.

With four-axle and eight-wheel steering, as compared to articulating vehicles, the operating performance of this vehicle may improve highway safety with better maneuverability, safer (controlled) tracking, better stability (both in low speed "counter-phase" steering, and during "in-phase" higher speed turning) and more control while executing turns.

All wheel steering may also improve productivity and increase energy efficiency. Even in reverse mode the vehicle may be safer and more efficient. Additionally, when turning with eight-wheel steering, with the rear wheels going in opposite directions, the front wheel cuts do not have to be deep and tire life will be improved as tire scuffing during turning may be largely eliminated.

The earlier reference to effective weight distribution is an important element for determining whether the vehicle of the present invention has productivity and safety advantages as compared to combination vehicles. The location of all four axles relative to primary undermount spaces 14 and 24 (FIGS. 4 and 5), the load capacity of such axles, the location of undermount spaces 13 and 25 (FIGS. 4 and 5), offsetting drive axle and differential weight, and the ride-height control and weight sensing and equalization of the air suspension system, ensure the vehicle may have well-balanced loaded axle weights.

Compared to five-axle combination vehicles, this four-axle configuration may exhibit a significant improvement in efficiency by more closely equalizing axle loads to their maximum allowable weights. Weight equalizing suspension systems are used on five (5) axle combination vehicles; however, such systems are never able to balance loads with complete efficiency because the location of all of the axles on such combination vehicles are never directly under the trailer cargo body.

One concern some may have with the 80,000 lb. GVWR configuration example of the present invention may be that with one fewer axle, there is also less braking power. However, braking performance is measured in stopping distances; therefore, with an electric (brake-by-wire) braking system, using dual-disc or wedge brake systems, with reliable controllers, these electric braking systems have the advantage of being hard-wired end-to-end, enabling these brake systems to get instant signals, with signal failures being extremely unlikely. Also, using correctly inflated and evenly loaded wide base tires, more positive braking effectiveness may be expected.

Additionally, absolute brake balance may be almost impossible to achieve with an articulated vehicle because of the pivot point, making perfect straight-line braking a rarity, with the combination vehicle trailer potentially moving laterally in a hard-braking situation, especially when the hard-braking situation occurs when the articulating vehicle is executing a turn, even a turn just involving a single lane change.

Also, never to be ignored, and always taken seriously, is the ever-present risk of the loss of low voltage and high voltage connectivity between the tractor and trailer's manual connections. The adverse effect to braking performance with lost or interrupted connectivity is always present in articulating combination vehicles.

Almost everyone has experienced driving behind a tractor-trailer and noticing the trailer tail-lights 'flickering,' which is a very common occurrence; if equipped with electronic brake systems, that specific tractor-trailer combination most likely would be unable to safely stop in an emergency braking situation.

One added point about braking, as long experience in the trucking industry has made clear: most trailers and many tractors, with four-axle and five-axle combination configurations, use dual tires at all axle positions other than the steer axle. Dual tires are well matched in width, circumference and radius (loaded and static) when new; however, one of the two matched tires may have a pressure loss and exhibit abnormal wear, one of the two may go flat and have to be replaced, and one of the two may hit an object in a loading dock or truck stop and have a sidewall cut, and have to be replaced, and in every one of these three situations the matched pair is separated and the replacement tire is almost never a good match. Even when technicians replace both tires (unless both are new), an attempt to get a match may be almost impossible. With all of these all-too-common conditions, the expected result may be tire imbalance, which may lead to increased rolling resistance or single tire overloading, which may lead to less efficient braking and longer stopping distances.

The problems of mating and matching dual tires do not exist with the use of the single wide-based tires used on all axle positions, as is preferred for all design configurations of the present invention.

Another advantage of any of the three non-articulating configurations, (e.g.) 80,000 lb., 60,000 lb. and 40,000 lb. GVWR vehicles, may be the location of charging ports. Unlike tractor-trailer combination vehicles, where charging ports must be located on the tractor, charging ports on these vehicles may be located at the front, middle or rear of the vehicle. In fact, the logical location for charging systems may be at loading docks, with or without wireless charging systems, making these the ideal location for the charging port on the rear frame of the vehicle.

The design simplicity of the vehicle of the present invention makes possible its adaptation to different length and weight requirements, and all design configurations, even the two-axle configuration, may use either battery-electric or hydrogen-electric propulsion systems and achieve greater range than comparably-sized vehicles in common use today using either hydrogen-electric or battery electric propulsion.

Economic case analyses (costs given as of 2019) are now provided to further illustrate various advantages which may be realized by the use of the present invention.

The inventor provided transportation services to a national retail grocer with approximately 4% market share, and as a result of a thorough analysis of the cost of transportation, using the four-axle, 62-foot configuration of the present invention, which is slightly shorter than the five-axle combination vehicles used by such grocer, this savings would be in excess of $25 million annually with diesel fuel at $3.00 per gallon. At $5.00 per gallon, the savings in direct transportation costs would be at least $30 million.

The savings are derived from the 62-foot configuration having a 57-foot cargo body, as compared to the 53-foot trailer in common use today. The addition of four feet enables the vehicle to carry two (or four, if stacked) additional pallets on every outbound and inbound movement, which is a 7%: percent productivity improvement.

Finally, with respect to the economics of operating the commercial vehicle of the present invention, and the other benefits cited above, and given its simplicity of design, this vehicle may be far less costly to build, and may be far less costly to maintain. Accordingly, it may be expected that most or all private and for-hire carriers, where cube and weight capacities are important, may want to secure a demonstration of this vehicle design for their businesses, making a functional prototype important for the eventual success of this design.

The research and development of this transportation technology, and bringing it to market, may increase the efficiency and safety of transportation systems, may improve air quality by reducing the use of fossil fuels, and may promote the use of alternative energy sources for the purpose of increasing energy efficiency. Use of the commercial vehicle of the present invention, in addition to what has already been stated, may also provide the following advantages:

1) more efficient, more flexible, more economical and more reliable supply chains may more quickly emerge as transportation is the 'beating heart' of all supply chains;
2) reductions of accidents where heavy trucks moving at high speeds impact stopped vehicles;
3) higher driver productivity by easing the stress of driving heavy trucks with the adoption and application of autonomous steering, acceleration and braking systems;
4) reduced injuries from slips and falls with the lower height of the entrance and exit steps at the operator's compartment;
5) faster movement away from greenhouse gas emissions with the introduction of a heavy truck design offering a more efficient use of electric energy than the designs currently being developed by North American OEMs;
6) an open and unobstructed pathway to more quickly introduce Level 5 Autonomous Systems into the commercial transportation market.

The design of on-board ESDS on a traditional two-axle or three-axle tractor chassis is a challenge, in terms of providing sufficient space for the ESDS between the front axle and the rear drive axle(s) (see prior art FIGS. 12-15). A three-axle non-sleeper conventional tractor in common use today may have no more than eight feet of space between the front and rear wheels to house ESDS components, and extending the wheel base to make more space for these ESDS components may only add unnecessary weight and may impede loading the steering axle, which is one of the major problems with articulating vehicle efficiency.

Such complications and restrictions may be avoided with the commercial vehicle of the present invention, as the amount of unrestricted undermount space for all ESDS components of compressed air energy and electric energy, is (e.g.) 37-feet, on each side of the vehicle; additionally, one problem with conventional truck cabs are the steps required to enter such cabs, and if a design replaced safely-designed steps with steps attached to battery pack covers or hydrogen tank covers, the impact on driver safety in terms of entering and exiting the operator compartment may be adverse.

All ESDS components used for the commercial vehicle of the present invention may be specially designed for the six undermount spaces 13, 14, 15, 23, 24 and 25 (FIGS. 4-5), with ground clearances of eight inches. For the eight feet at the center of the vehicle body, the ground clearances for such enclosed spaces may be greater than eight inches to insure sufficient clearances at depressed loading docks.

Specific sizes, structural supports, ground clearances and connectivity for all ESDS componentry may be specially designed by electrical and structural engineers, as will be understood by those of ordinary skill in the art. Two-, three- and four-axle configurations of the present invention have ample space available to address these ESDS design questions, and safe and effective solutions may be quickly developed.

With respect to improved productivity and efficiency, as compared to three-axle, four-axle and five-axle articulating vehicles (whether internal combustion, battery electric or hydrogen electric), preferred attributes of the commercial vehicle of the present invention include: 1) faster access to docks and quicker operator access and exit; 2) enhanced yard and highway maneuverability; 3) quicker acceleration; 4) enhanced axle weight distribution for more efficient and faster cargo loading; 5) faster turning and backing with (e.g.) four steer axles; 6) additional length of floor space (e.g., four feet); and 7) less downtime and equipment failures, as hydraulic powered steering, braking and cargo lifting devices may be replaced with all-electric systems and components, reducing cost to build, coat to maintain, and reducing vehicle weight.

Additionally, as noted above, all energy is produced only by battery-electric, hydrogen-electric or compressed air systems, while the connectivity of such systems may be hardwired and permanently connected. This is in contrast to hydraulic systems, preferably not used on any of the alternative examples of the present invention, but often used for cargo lift systems, as well as for steering and braking, with articulating combination vehicles; such hydraulic systems have more and heavier parts, including high pressure hoses and connections, compressors, pistons and pumps, all of which are subject to higher incidence of leakage and failure, and all more expensive to maintain than electric-powered components.

As range is primarily a function of the amount of electrical energy produced, with up to (e.g.) 74 feet of undermount space for all ESDS components, vehicles of the present invention may have a range unequaled as compared to battery-electric or hydrogen-electric powered combination vehicles.

The benefits of adopting of Autonomous Vehicle Systems cannot be overstated. Highway Safety Advocates predict that fully developed, tested and certified autonomous systems in highway vehicles will save thousands of lives. As a zero-emission non-articulating vehicle, with (e.g.) four steer axles and large capacity ESDS, the commercial truck of the present invention will quickly adopt Level 5 Autonomous System Design.

As detailed above, this non-articulating design facilitates "hard-wired", "fail-safe", and permanently-connected electrical and pneumatic connectivity for braking, steering, lighting, cameras, radar, telematics, tire air pressure, communications, autonomous controllers, electric cargo lifts, cargo cooling and heating and propulsion control, thereby providing a significant step forward to adopting autonomous systems into this preferred invention.

An important safety-oriented element of the present invention that cannot be overstated in the quest for successful autonomous vehicle design is the permanent connectivity that virtually eliminates all manual connect/disconnect functions (which must occur every time a trailer is coupled and decoupled from a tractor) which, as earlier stated, eliminates the ever-present threat of exposing air lines and electrical wires to becoming snagged, torn or disconnected in the dangerous and open space between the tractor and trailer, which can result in: seal failures; moisture, dirt, ice or salt contamination; or incomplete or partial connections.

By addressing these serious flaws in articulating vehicle design, the vehicles of the present invention may introduce a solution in a commercial truck design that makes electrical signal failures and air pressure losses virtually impossible, and may speed the adoption of autonomous system designs, and as such may be leading the way forward to much safer commercial transportation.

Addressing the methodology for a reduction in the number of trailers from transportation operations requires some discussion. Inside Distribution Centers, the selection of the products and staging of such products often may be performed at or near the truck loading areas, and typically pallets of such products are then quickly loaded onto trailers, making this transition straightforward. Accordingly, eliminating a large percentage of trailers becomes an additional direct and sizable benefit to companies that can effectively plan and schedule cargo loading and unloading activities.

The cost of a refrigerated trailer in 2022 is at least $70,000, and the cost of a non-refrigerated trailer is at least $22,000. Eliminating some of these costs is a worthwhile and beneficial undertaking, made more realistic with advancing transportation technologies.

Within new distribution center design, both physical and digital, it is reasonable to assume with new data analytics, including 5G networks and block-chain technologies, load planning algorithms and more precise visibility of transportation capacity and demand may become a reality. With such new precision in transportation scheduling, the efficiencies developed may enable private fleets, dedicated fleets, specialized fleet operations, and large LTL (Less-Than-Truckload) fleets, that operate with significant terminal-to-terminal line-haul movements, to substantially reduce transportation costs by reducing the size of their trailer fleets.

This is especially true of private fleets and dedicated carriers operating as de-facto private fleets, and certainly true of some well-run for-hire carriers, where such fleets and carriers have effective controls of all transportation scheduling and complete end-to-end visibility of fleet movements, enabling them to more quickly reduce trailer fleet sizes.

Commercial application of the present invention, especially in the four-axle configuration, may be easily and quickly integrated into much of the open-top and flatbed trailer transportation services as the top and side loading of such trailers is usually done while such trailers are coupled to tractors, and even after deliveries are made such trailers almost always remain coupled to tractors unless decoupled for both scheduled and corrective maintenance services.

Many other industries may readily adopt the operating model of the present invention, and it is to be expected that many may find such adoption to be more efficient overall, especially where pallets are used. Even in industries where there is limited space, and where products need to be preloaded, or hand-loaded, they may still have elements of their operations where the present invention may be beneficial for many of the reasons stated.

As noted above, the economic benefits using this concept in the retail grocery industry may be significant, and there are many other industries where savings from additional pallet positions and overall cargo capacity, both weight and cube, may be realized, such as beverage, building materials, corrugated and box manufacturers, food manufacturers, consumer goods manufacturers, and manufacturers of light and bulky commodities. Even common and contract motor carriers may benefit from the use of the present invention, such as dedicated contract services, terminal-to-terminal movements, and specialized transportation services.

Given how many LTL and full-truckload for-hire carriers operate, it is to be expected that many such carriers operating 80,000 lb. GVWR combination vehicles, including 28-foot doubles, may find it advantageous to have a mixed fleet of traditional combination vehicles with the 4-axle 80,000 lb. GVWR of the present invention.

With the advancing technologies of heavy truck powertrains becoming battery-electric or hydrogen-electric, and with the arrival of Level 5 Autonomous Systems for heavy truck design, especially as Level 4 has essentially been reached, the time is fast approaching for the unique non-articulating design vehicle configurations of the present invention to be developed as prototypes, thoroughly designed, fully tested, and strategically placed into specific service environments where the advantages discussed here may be observed and experienced under actual operating conditions.

Replacing traditional three-axle, four-axle and five-axle tractor-trailer configurations, and certain two-axle straight truck configurations, in urban and regional applications, where the present invention may yield improvements in safety, air quality and productivity, are all worthy solutions from any perspective. Making accurate predictions about market penetration with the design configurations of the present invention is difficult; however, with the inventor's experience in commercial transportation, it can be envisioned that of the total market share of 80,000 lb. GVWR five-axle articulating combination commercial vehicles, the present invention, in its four-axle configuration, may initially displace as much as 10% of such market, and over time displace more than 10%. With respect to the urban and regional-oriented two-axle straight truck market and three-axle combination vehicle markets, it is expected that market penetration for these configurations may be significantly higher.

It can be expected that within a relatively short period, solid state batteries and remote (wireless) automotive battery charging will be a commercial reality. When this occurs, the above prediction for the 5-axle 80,000 lb. GVWR market displacement by the present invention may rise even more significantly, and secure an even more significant portion of the 2-axle straight truck and the three-axle combination vehicle markets, in both urban and regional operating areas.

With respect to solid state batteries and more efficient charging of such batteries, the 'Wall Street Journal', Sep. 29, 2021, in an article titled: "Volkswagen, Ford, Other Big Auto Makers Push to Make Solid-State Batteries the Next Big-Thing for EV's", is certainly suggesting large scale momentum in the development of new technologies for battery-electric vehicle propulsion. And in a Sep. 30, 2021 article in 'Heavy Duty Trucking' it was reported that the USDOE has a project underway to develop Class 8 (Commercial Truck) wireless charging systems; and another article in 'Heavy Duty Trucking' disclosed a new technology by a company called WiTricity that may make wireless charging possible for all types of electric vehicles. This all suggests that EV technologies in batteries and charging systems will continue getting so much more efficient that the movement from internal combustion propulsion to battery-electric propulsion will be irresistible and irreversible.

In the future, near or far, when fast-charging, lightweight, solid-state batteries and remote (wireless) charging technologies are perfected, and in-service at most truck stops, the operating range of commercial trucks of the present invention may be comparable to traditional five-axle combination vehicles, whether internal combustion, battery-electric or hydrogen-electric, and may be efficiently used in longer interstate movements with layovers; however, such comparison must then take into account the design flexibility of the present invention regarding length, in addition to the operating range, as the features and benefits of the three- and four-axle configurations of the present invention may offer significant productivity, efficiency and safety advantages over five-axle combination vehicles.

Projecting a comparison of 5-axle 80,000 lb. GVWR combination vehicles, with 70-feet of overall length and an overall design in common use today, to the present invention with the same overall length, both with 48-inch sleeper berths, would describe how the present invention may have an extraordinary productivity benefit for transportation of lightweight and bulky commodities, and commodities where floor-space is critical.

For example, the shortest sleeper tractor in common use today has a cab length of 13 feet, including a 48-inch sleeper berth. The total length of this combination vehicle is 70 feet: 13 feet for the cab, 4 feet between the cab and trailer, and 53 feet for the trailer. The 4-axle 80,000 lb. GVWR design of the present invention may easily be designed and built to this same 70-foot overall length, with no change to the axle configuration, and no significant increase in empty weight.

The four-axle 80,000 lb. GVWR configuration of the present invention, described in the paragraph above, may have a cargo body length of 61 feet, (70 feet minus 5 feet for the operator's compartment and 4 feet for the sleeper berth) which is a 15.1% cubic capacity increase over the standard 53-foot trailer. If there was no refrigeration system, and the 48-inch sleeper berth was placed above the operator's compartment, or if there was no sleeper berth, and layovers were made at motels (which is a common practice), the cargo body length would be 65 feet, which is a 22.6% increase in cubic capacity. This is clearly a profound productivity improvement that would expect to be in great demand by any fleet, private or for-hire.

In addition to such substantial benefits already stated, there may be other clear and realizable benefits from commercial vehicles of the present invention operating in longer distance movements, including:

A) At the longer body length referred to above having a 70-foot roof length, such configuration may have an even larger energy source available for normal operations, or for emergencies, from 68 feet of solar panels;

B) With its low center of gravity vehicles of the present invention may be less likely to experience instability in high winds or on severe or compound curves, elements generally expected and encountered in long distance transportation.

C) With its non-articulated and integrated cargo body design, the vehicle operator, while in-transit, especially over long distances, may have systems in-place to continuously monitor the cargo body interior for temperature, humidity, and the stability of the cargo.

D) The 53-foot trailers, the most common sized trailer in use today in interstate movements, may track, or trail, unsafely when operating on horizontal curves if the axles on such trailers are inadvertently slid too far to the rear. Almost all states have rules where the axles on 53-foot (or longer) trailers must be positioned to prevent trailer-tracking outside of the lane of travel, referred to as KPA (king-pin-to-axle) measurements, expressed in feet. For example, in California the KPA distance is 40 feet, in West Virginia it is 37 feet (mountainous terrain, shorter KPA for horizontal curves), and in Indiana it is 43 feet (flatter terrain, longer KPA for horizontal curves). The trailing danger with long combination vehicles is two-fold. First, inadvertent sliding of trailer axles too far to the rear may occur, creating unsafe trailing, especially on two lane roads. Second, there is a risk of a combination vehicle travelling from an Indiana point of origin, with its trailer axle KPA correctly set at 43 feet, and travelling through West Virginia, where a 37-foot KPA is mandated, without correcting the trailer axle KPA to 37 feet, potentially exposing oncoming traffic on two-lane West Virginia roads to unsafe conditions. With its non-articulating design and all-wheel "in-phase" steering, vehicles of the present invention solve the trailing problem inherent to combination vehicles, and with radar and camera systems integrated into the autonomous systems this design may be inherently safer with near perfect tracking characteristics.

E) In addition to housing ESDS componentry, under-mount spaces 13, 14, 15, 23, 24 and 25 (FIGS. 4-5) are fully enclosed and may be built with a smooth frontal surface for the full length of these compartments, going wheel-to-wheel with a very effective aerodynamic design, and as such would have the same function as the side-skirting used on many long-distance combination vehicle tractors and trailers; however, in the configuration of the present invention the aerodynamics may be more efficient as the side skirting would cover more than what is covered in combination vehicles in common use today, and there would be no tractor-trailer gap, which creates a 'drag' from unstable air forming a vortex between the tractor and trailer, and there is no landing gear and no open space under the cargo body, both of which creates turbulence and 'drag' and cannot be eliminated or effectively enclosed. Additionally, the rear of the body of the present invention may have aerodynamically designed 'wings' to improve air flow over the vehicle and reduce the rear vortex-effect that creates drag on the vehicle, and eight (8) aerodynamically designed wheel covers may be installed over all eight (8) wheels. With the aerodynamically designed front radius, front corners, bumper and contoured frontal roof area, such configuration of the present invention, at 70 feet in overall length, may have a drag-coefficient at least as low as the most aerodynamically efficient 70-foot combination vehicles in common use today.

Admittedly, a sleeper berth above the operator's compartment would be unique (and only appropriate in a single-man operation where the use of the sleeper would only be when the vehicle was parked); however, a 22.6% cubic capacity increase, which is an increase of ten (10) pallet positions from the 70-feet long, 5-axle combination vehicles in common use today, by any measure, is a huge improvement in productivity that may be irresistible to any commercial transportation enterprise.

With this level of increased cubic capacity afforded by the present invention at 70-feet of overall length, there may likely be further and faster penetration into the heavy truck market. Such added penetration may yield the benefits already projected, including increased energy efficiency, less heavy truck greenhouse gas emissions, fewer heavy trucks on the road, positive effects to the chronic truck driver shortage, improved supply chain performance, safer interstate highway system, increasing transportation productivity, and faster adoption of Level 5 Autonomous Systems.

As stated above, the present invention also addresses the critical issue of the commercial driver shortage. If commercial vehicles of the present invention went into service in 10% of the 80,000 lb. GVWR combination vehicle market, with a minimum of a seven percent (7%) increase in productivity, the effect on the driver shortage may not be immediately noticeable; however, a more substantial impact may be realized in the two-axle and three-axle markets. Additionally, if vehicles of this design evolve to the 70-foot length described above, with ESDS using solid state batteries, remote charging, and with Level 5 Autonomous Systems in place, the market penetration of this present invention may be more significant and have a more noticeable effect on the commercial driver shortage by attracting more younger people to the industry, and by keeping those currently driving from leaving the industry.

A four-axle, 80,000 lb. GVWR commercial highway vehicle would be quite rare, if one exists at all. Compliance with the current federal 80,000 lb. Bridge Law Gross Weight Limits applied to commercial highway vehicles would require that vehicles of the present invention be 68-feet long, have a fifth axle, or be restricted to a GVWR of 76,000 lbs., none of which is acceptable.

With vehicles of the present invention, the fifth axle is not relevant, as the 80,000 lb. capacity vehicle of the present invention has the required outer axle spread of 51 feet, which is the same as the five-axle combination vehicles, and displaces 80,000 lbs. over four axles, with spreads of 10 feet for each axle set, which is in compliance with the specific Bridge Formula that is used for 10-foot spread axle weight compliance. In fact, the 80,000 lb. weight distribution over the 51 feet of this vehicle may be far more balanced than the weight distribution over 51 feet of five axle 80,000 lb. GVWR tractor-trailer combination vehicles.

Bridge laws are essentially "weight-to-length" laws, and if such laws allow a single axle to carry 20,000 lbs. the requirement for the fifth axle may be relevant only for combination vehicles where the steer axle is needed to achieve an 80,000 lb. GVWR. Given this, the basis for a fifth axle exemption for vehicles of the present invention is reasonable and defensible. Further, nothing in the axle configuration of vehicles of the present invention would create an overload risk on any public road or bridge; instead, given their weight distribution as compared to combination vehicles in common use today, just the opposite would be expected.

Given all of this, and given that federal bridge laws in the past have been modified for 80,000-pound GVWR tractor-trailer combination vehicle axle and length configurations, and also given that the present invention would allow the replacement of many 80,000-pound GVWR tractor-trailer combination vehicles with a non-articulating 80,000-pound GVWR configuration that exhibits a long list of stated benefits, it can be predicted that the arrival of vehicle designs of the present invention will cause the applicable federal laws (USDOE and USDOT) to be revised to secure a fifth axle exemption.

Referring now to FIG. 10, the first alternative exemplary example of the present invention to FIG. 1 is shown. The FIG. 10 vehicle design is shown in the configuration of a three-axle vehicle with a 60,000-pound GVWR. Exemplary dimensions are as follows:

1) operator compartment length of 60-inches (A), providing space for the front mounted cargo refrigeration/heating system above the operator compartment;
2) overall length (B) of 53-feet;
3) overall height (C) of 13 feet, 6 inches;
4) width of rear undermount space 34 of 60-inches;
5) width of middle (secondary) undermount space 33 of 60-inches;
6) width of forward undermount space 31 of 60-inches;
7) wheelbase (G) of 32-feet, required for GVWR at 60,000 lbs.;
8) width of middle (primary) undermount space (H) of 17 feet, 8 inches;
9) wheelbase between two rear driven axles (J) of 10-feet, the minimum distance for each axle to carry 20,000 lbs.;
10) front steer axle 35A rated at 20,000 lb. capacity; and
11) two rear driven axles 36A and 37A, both steer axles, each rated at 20,000 lb. capacity, and both powered by the ESDS of undermount space 32, with such power supplied to each axle alternately, or simultaneously, as may be required by operating conditions.

In addition to the width of undermount spaces 31 through 34, the height of each such compartment is (e.g.) 35-inches, and the depth of each such compartment is (e.g.) 34-inches. The dimensions as to each of the four undermount spaces may be identical on each side of this vehicle. This three-axle configuration with the 32-foot wheelbase can be built with an overall body length of between 48-53 feet. The 53-foot dimension referred to above includes undermount space 34 at 5-feet wide. Removing undermount space 34 from the vehicle would reduce the overall length to 48-feet.

It will be understood that the differences between the above dimensions may be whether undermount space 34 was not needed and deleted, or if an electric cargo lifting device was specified that may be 'tuck-a-way' or 'glide-under,' requiring an added 5-feet of undermount space 34 to house such device.

A rear-frame mounted electric cargo rail-lift device may be attached to the rear frame directly behind the space designed for rear underride protection, and such frame-mounted cargo lifting device may not need any additional undermount space as the electricity would be directly hard-wired from undermount space 34, and if undermount space 34 was eliminated the electricity for the rail-lift may be supplied from undermount space 33.

If undermount space 34 remained in place, at 5-feet of length, and the electric cargo rail-lift was mounted onto the rear frame as specified above, undermount space 34 may be used to provide ESDS for the frame mounted cargo lift device and the electric roll-up rear door, and 34 may also provide back-up or emergency power generation to support all other non-propulsion electrical power requirements of the vehicle.

Fifty-one (51) feet of roof-mounted solar panels 21 may be provided to supply auxiliary ESDS or power for the front-mounted cargo refrigeration and heating system.

Still referring to FIG. 10, the undermount space 31 (applicable to both sides) may perform the same functions as the undermount spaces 13, 25 of the four-axle configuration while the undermount space 33 (applicable to both sides) may perform the same functions as undermount spaces 15 and 23 of the four-axle configuration, all shown on FIGS. 1, 4, 5 and 7.

The primary undermount spaces for vehicle propulsion 32, identical on both sides, may both perform identical functions as spaces 14 and 24 of the four-axle configuration in FIGS. 1, 4, 5 and 7. With shorter interior wheelbases, the height of undermount space 32 may not have to be reduced for clearances in depressed docks.

While the example in FIG. 10 is 53-feet in overall length, with a 32-foot wheelbase, this configuration can alternatively be built, for example, with a 39-foot wheelbase, providing an overall length of between 55-60 feet. This design can maintain its 60,000 lb. GVWR for cargo body lengths from 50-55 feet. The functionality of the components may be the same as the component functionality of the 32-foot wheelbase vehicle, with the additional length for the primary undermount space 32 increasing from (e.g.) 17 feet, 8 inches to 24 feet, 8 inches.

As an alternative design, the primary space 32 at 24 feet, 8 inches could be separated into two distinct undermount spaces, with the rearmost 5-feet having the identical functionality of undermount space 33, and the former location of undermount space 33 becoming undermount space 34. The 60-inches of space of the former undermount space 34 may be eliminated, or such space may be used to house an undermount glide-under or tuck-a-way electric cargo lifting devices.

It should be noted that the most common trailer lengths currently operated today are 53-feet, with shorter versions at 42-feet and 45-feet in overall length, and all such trailers may have rear door frames and front bulkheads which decrease the usable interior space. The design configurations disclosed here all preferably have the same reductions in usable cargo space from door frames and bulkheads.

With the exception of access to the operator compartment, the left and right sides of the vehicle in FIG. 10 may be identical. Components shown in FIG. 10 that are not identified or detailed may be identical to the components of the preferred example of the present invention FIGS. 1-9. For example, the FIG. 10 example, with respect to operating efficiency, energy efficiency, operating range, productivity, safety, cost to build and maintain, maneuverability, sustainability, autonomous system adaptability, cargo security, design flexibility vis-a-vis battery-electric propulsion or hydrogen-electric propulsion, and energy boost from full-length solar panels, may replicate all of the functionality of the preferred embodiment of the present invention as shown in FIGS. 1-9.

While the vehicle in FIG. 10 is a design more oriented to regional transportation, such vehicle has the same attributes and advantages as the preferred example in FIG. 1; additionally, the vehicle in FIG. 10 may operate as efficiently and safely in more long-distance types of transportation as it may have comparable capacity and range as the most efficient combination vehicles in use today that are powered by internal combustion, battery-electric or hydrogen-electric energy.

The three-axle configuration of the present invention may have an overall length with the 32-foot wheelbase of between 48-53 feet, and the overall length of this configuration with the 39-foot wheelbase may be between 55-60 feet. However, this configuration may be built with any wheelbase between 32-39 feet, with appropriate changes made to the dimensions and functionality of the undermount spaces.

Referring now to FIG. 11, a second alternative exemplary example is disclosed. This design is a two-axle vehicle with a 40,000-pound GVWR, which has the following exemplary dimensions:

1) overall height (K) of 12 feet, 6 inches;
2) overall width of 8 feet, 6 inches;
3) overall length (A) of 41-feet;
4) operator compartment length (B) of 5-feet;
5) cargo body length (C) of 36-feet;
6) length of undermount space 41 (D) of 15 feet, 4 inches;
7) wheel opening widths of 56-inches for each axle location (E) and (L);
8) width of undermount spaces 40, 42 ((H) and (F)) of 60-inches each;
9) wheelbase (G) of 20-feet;
10) length of rear underride protection, side lights, camera and radar systems (J) of 16-inches;
11) forward non-driven steer axle 38A rated at 20,000 lb. capacity; and
12) rear driven steer axle 39A rated at 20,000 lb. capacity.

The undermount spaces 40 and 42, which may be duplicated on both sides, may each be 34-inches deep and 35-inches high, and all four of such spaces may house the componentry that perform exactly the same functions as such componentry in undermount spaces 13, 15, 23 and 25 shown on FIGS. 1, 4, 5 and 7 of the four-axle configuration of the present invention.

The primary undermount space 41 (FIG. 11), which may be duplicated on both sides, may house all the ESDS components for propulsion, and may perform the identical functionality as such components in undermount spaces 14 and 24 (FIGS. 1, 4, 5 and 7) of the four-axle configuration of the present invention. Roof mounted solar panels 21 may be (e.g.) 39 feet long, providing power for an electric front mounted cargo heating/refrigeration system, or if none installed, providing reserve electric power.

Still referring to FIG. 11, front axle 38A may be a non-driven steer axle and rear axle 39A may be a driven steer axle. With the exception of the access point to the operator compartment, both sides of the vehicle may be identical.

There is much design flexibility in the two-axle configuration of FIG. 11. The overall length may be as long as 50-feet by increasing the wheelbase to 29-feet, increasing the width of undermount spaces 41 to 24 feet, 4 inches. With this increased width, the same reconfiguration may be made as with the three-axle configuration, FIG. 10, using 5-feet at the rear of undermount space 41 to duplicate the functionality of undermount space 42, and using the space where undermount compartment 42 had occupied as space for an undermount 'tuck-a-way' or 'glide-under' electric cargo lifting device.

Still referring to FIG. 11, with undermount space 42 housing an undermount cargo lifting device and the primary undermount space 41 reduced to two distinct undermount spaces, and with the rear five-feet performing the same functions as spaces 15 and 23 (see FIGS. 4 and 5), the remaining 19 feet, 4 inches of undermount space 41 may be used to house all the ESDS components located in undermount spaces 14 and 24, and such available space may be exclusively used for vehicle propulsion.

No dimensional or functional changes need be made to undermount spaces 40 and 42 if a frame-mounted electric cargo rail-lift is used rather than an undermount cargo lifting device, and undermount space 41 may retain the 24 feet, 4 inches of ESDS space.

If no undermount cargo lifting device is used, or if a rear frame-mounted electric cargo rail-lift device is installed, and the functionality of undermount space 42 does not change, and even as earlier concluded that this two-axle configuration may be primarily oriented to battery-electric propulsion in local and short haul transportation, with the 24 feet, 4 inches of available space for ESDS in undermount space 41, all dedicated and designed for exclusive ESDS for propulsion, this two-axle configuration of the present invention may have unequaled operating range as a battery-electric powered vehicle, or even as hydrogen-electric powered vehicle, whereas some applications with hydrogen-electric propulsion may offer specific advantages over battery-electric propulsion.

A significant productivity, safety and efficiency design of the vehicle in FIG. 11 may be the position of the axles relative to the cargo body. Preferably, the axle locations are almost directly under the cargo body, enabling the weight equalization suspension systems to most effectively balance the axle loads.

Components shown in FIG. 11 that are not identified or detailed may be identical to the components of the preferred example of the present invention identified in FIGS. 1, 4, 5, 8 and 9.

Even as the vehicle in FIG. 11 may be designed primarily for more local and short-haul transportation, and may be expected to be powered by battery electric propulsion, rather than hydrogen-electric, the unique features of this vehicle, with respect to operating efficiency, energy efficiency, operating range, productivity, safety, cost to build and maintain, maneuverability, sustainability, autonomous system adaptability, cargo security and solar panel energy boost, may replicate all of the beneficial functions disclosed in the example of FIGS. 1-9, with the main differences being in length, number of axles, size of undermount spaces, and overall height.

As the three-axle configuration of the present invention may have different length wheelbases, the two-axle configuration of FIG. 11 may also have variability in wheelbases, with lengths of 20-feet to a maximum wheelbase length of 29-feet, creating significant flexibility by enabling cargo body lengths of between 36-45 feet.

As with the three-axle configuration of the present invention, the shorter wheelbases of the two-axle configuration may not need to shorten the height of undermount space 41 for depressed dock clearances.

Referring now to FIGS. 16-21, a comparative turning radius analysis is now described to further explain the advantages of the present invention. The relative turning characteristics of Vehicle "A," a five-axle articulating tractor-trailer combination vehicle with a 51-foot wheelbase, is compared to the turning characteristics of Vehicle "B," a four-axle non-articulating vehicle of the present invention, having an identical 51-foot wheelbase.

Figure 16:
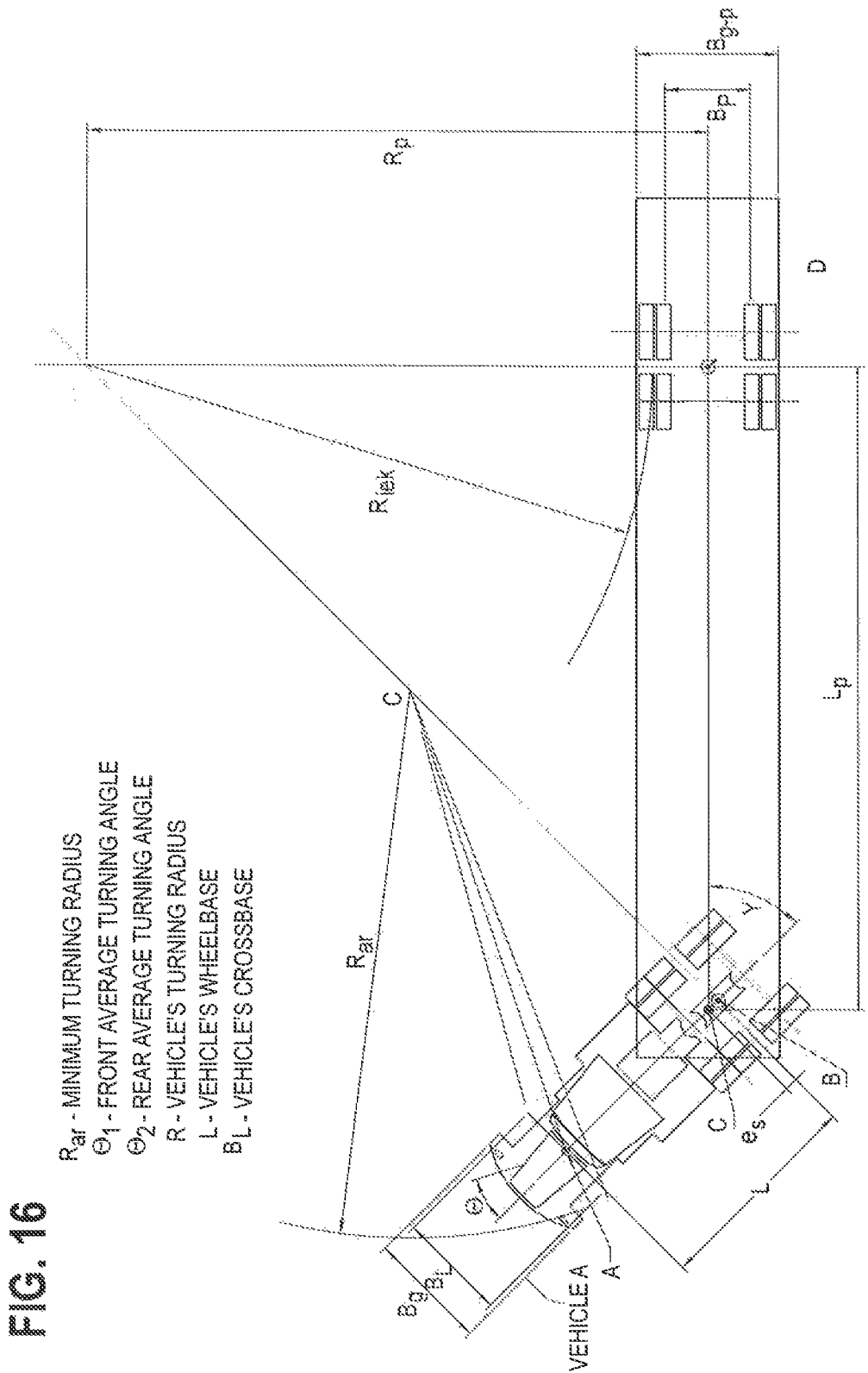
FIG. 16 is a schematic diagram of a conventional trailer-tractor truck combination executing a turning maneuver at 45 degrees, and showing the turning formula variables applied to such maneuver.

Referring first to FIG. 16, Vehicle "A" is a five-axle articulating tractor-trailer combination vehicle with a three-axle tractor having: a 150-inch wheelbase, measured from the center point of the steer axle hub to the center point of the rear tandem axles; an overall wheelbase of 51-feet, measured from the center point of the steer axle hub to the center point of the rearmost trailer axle hub; a 96-inch wide steer axle track; a 96-inch wide tandem drive axle track; a 102-inch wide trailer tandem axle track; a trailer king pin (pivot point) set at 10-inches ahead of the center point of the rear tandem axles; a trailer king pin-to-tandem trailer axle center line of 40-feet (KPA); the tractor tandem axles are set at a 52-inch hub-to-hub distance; the tires are 10.8-inches in width and have a 41-inch diameter with a 19.6-inch loaded radius, and an overall width of the dual tires on both tractor and trailer of 24-inches, with a 2-inch space between the tires; and a 40-degree front axle wheel cut. Vehicle "A" is one of the most common configurations of an 80,000 lb. capacity five-axle combination vehicle operated in regional transportation.

Still referring to FIG. 16, the following formula was used:

$$Rar = \sqrt{(R+BL/2)^2 + L^2} = \sqrt{(L*\cot(\text{average turning angle}) + BL/2)^2 + L^2}$$

With FIG. 16: "A" is the center point of the front axis; "B" is the center point of the rear tandem of the tractor; "C" is the pivot point for the articulated joint between the tractor and the trailer; and "D" is the center point of the rear tandem of the trailer.

Figure 17:
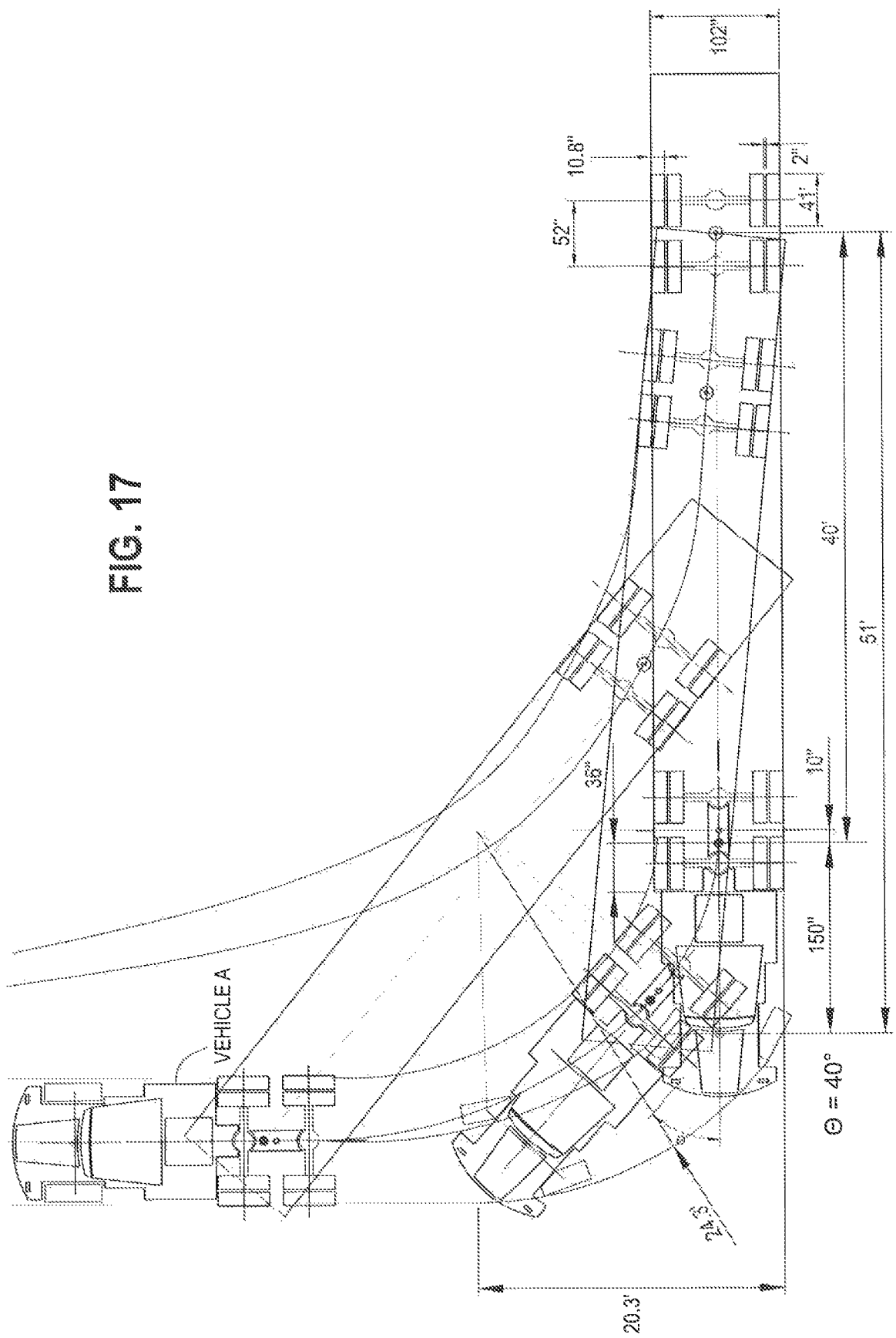
FIG. 17 is a schematic diagram similar to FIG. 16, with the turning maneuver progressing to 90 degrees.

Referring to FIG. 17, Vehicle A is shown executing a 90-degree turn with a 40-degree front axle wheel cut.

Figure 18:
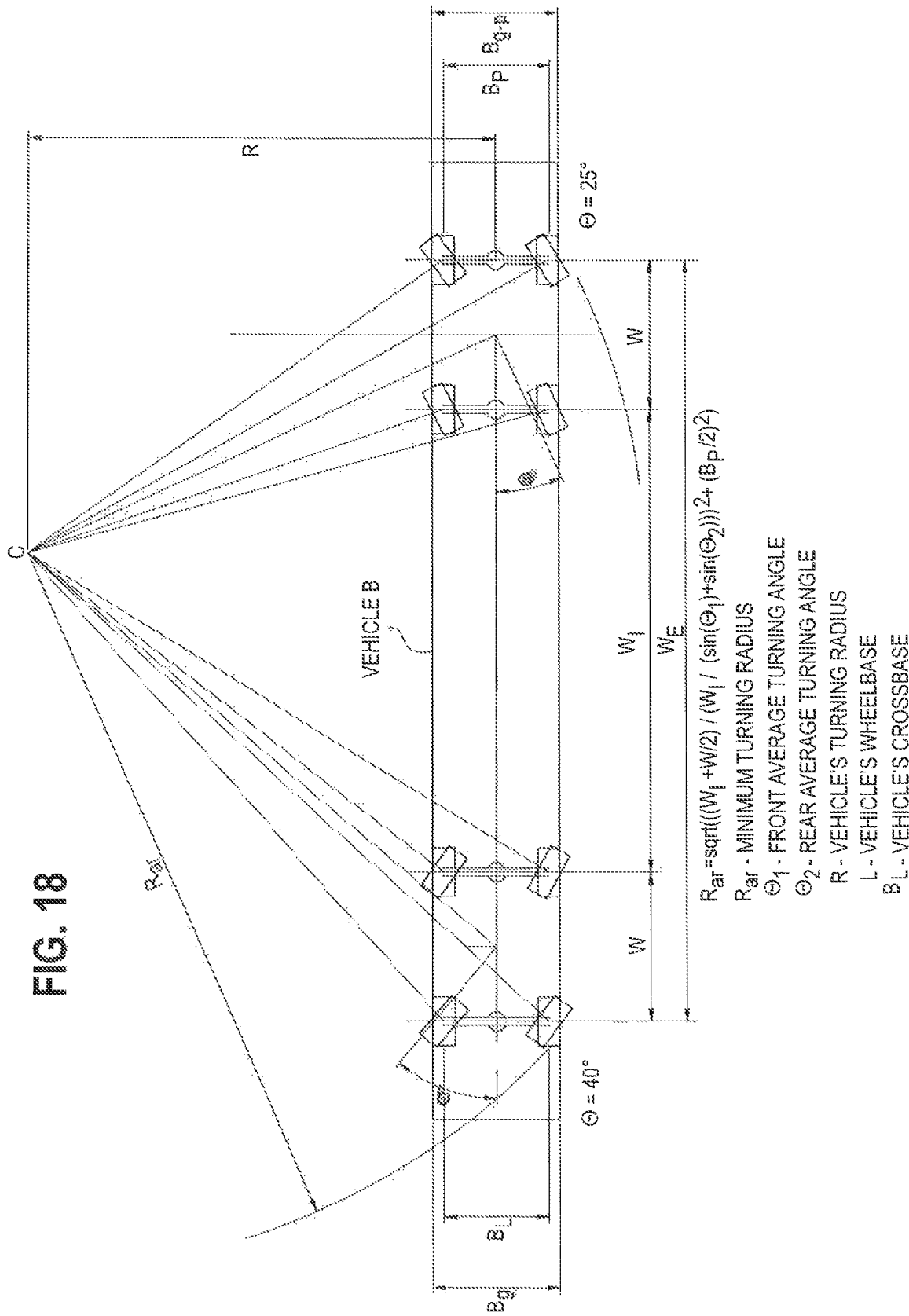
FIG. 18 is a schematic diagram illustrating various turning formula variables with the four (4) axle non-articulating vehicle of the present invention.

Referring to FIG. 18, Vehicle "B" is the preferred example of the present invention, a four-axle non-articulating vehicle with: a 51-foot wheelbase, measured from the center point of the forward-most axle hub to the center point of the rear-most axle hub; 31-feet between the center point of the two intermediate axle hubs; 10-feet between the center point of each of the front two axles hubs and 10-feet between the center point of each of the rear two axle hubs; a 102-inch wide wheel track for all eight wheels; eight tires each 17.5 inches wide and 39.2-inches in diameter; all-wheel steering; and a 40-degree wheel cut on the front four wheels of the two forward axles, and a 25-degree wheel cut on the four wheels of the two rear axles. The formula shown at FIG. 18 can be used to derive the minimum turning radius $R_{ar}$.

Figure 19:
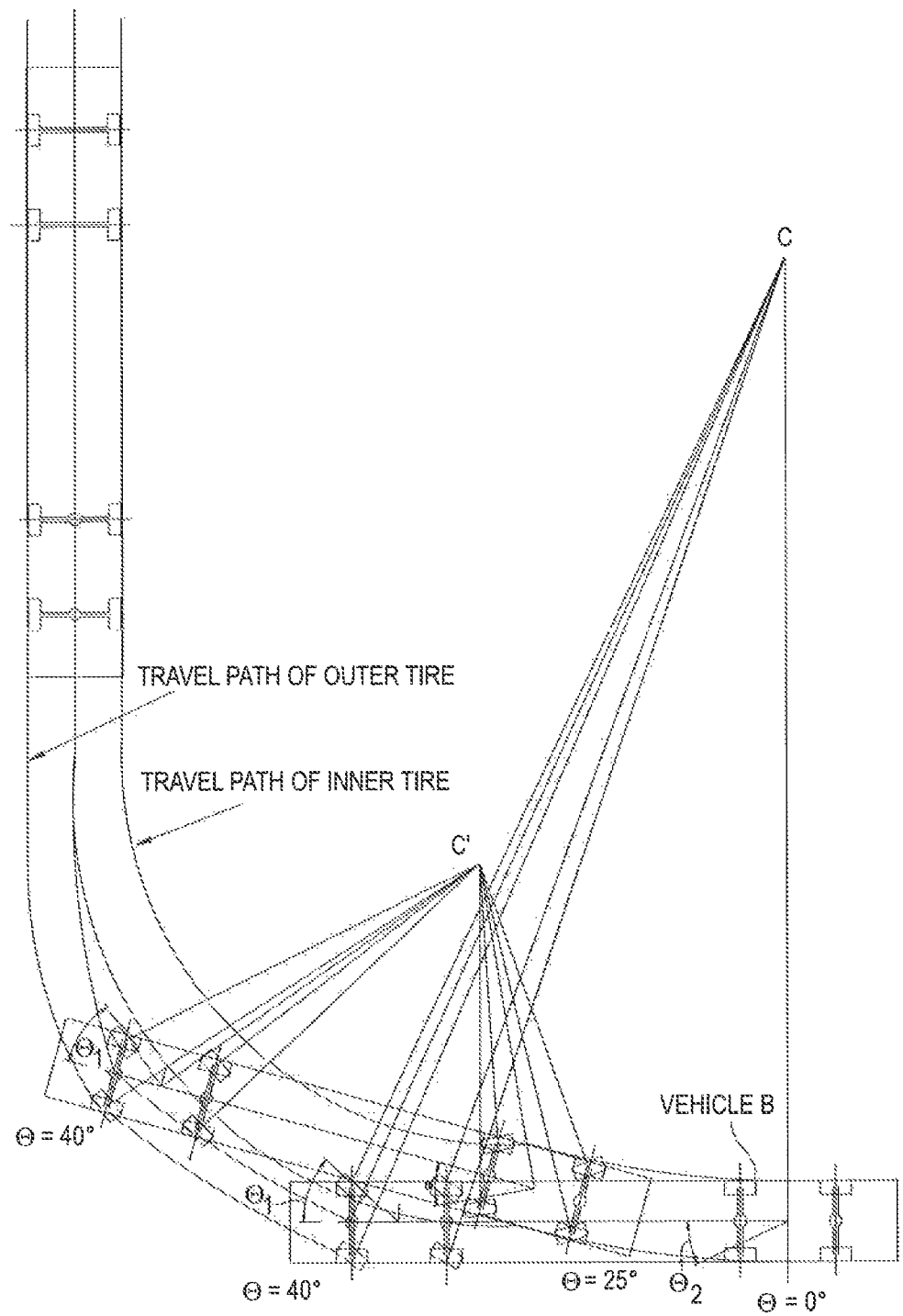
FIG. 19 is a schematic diagram illustrating the vehicle of FIG. 18 executing a 90-degree turn with an immediate wheel cut of 40 degrees for the four (4) wheels of both front axles, and a 'delayed' wheel cut of 25 degrees for the four (4) wheels of both rear axles, executed at 30 feet into such turn.

FIG. 19 shows Vehicle B executing a 90-degree turn with an immediate wheel cut of 40-degrees for the four wheels of both front axles, and a 'delayed' wheel cut of 25-degrees for the four wheels of both rear axles, executed at 30-feet into such turn.

Figure 20:
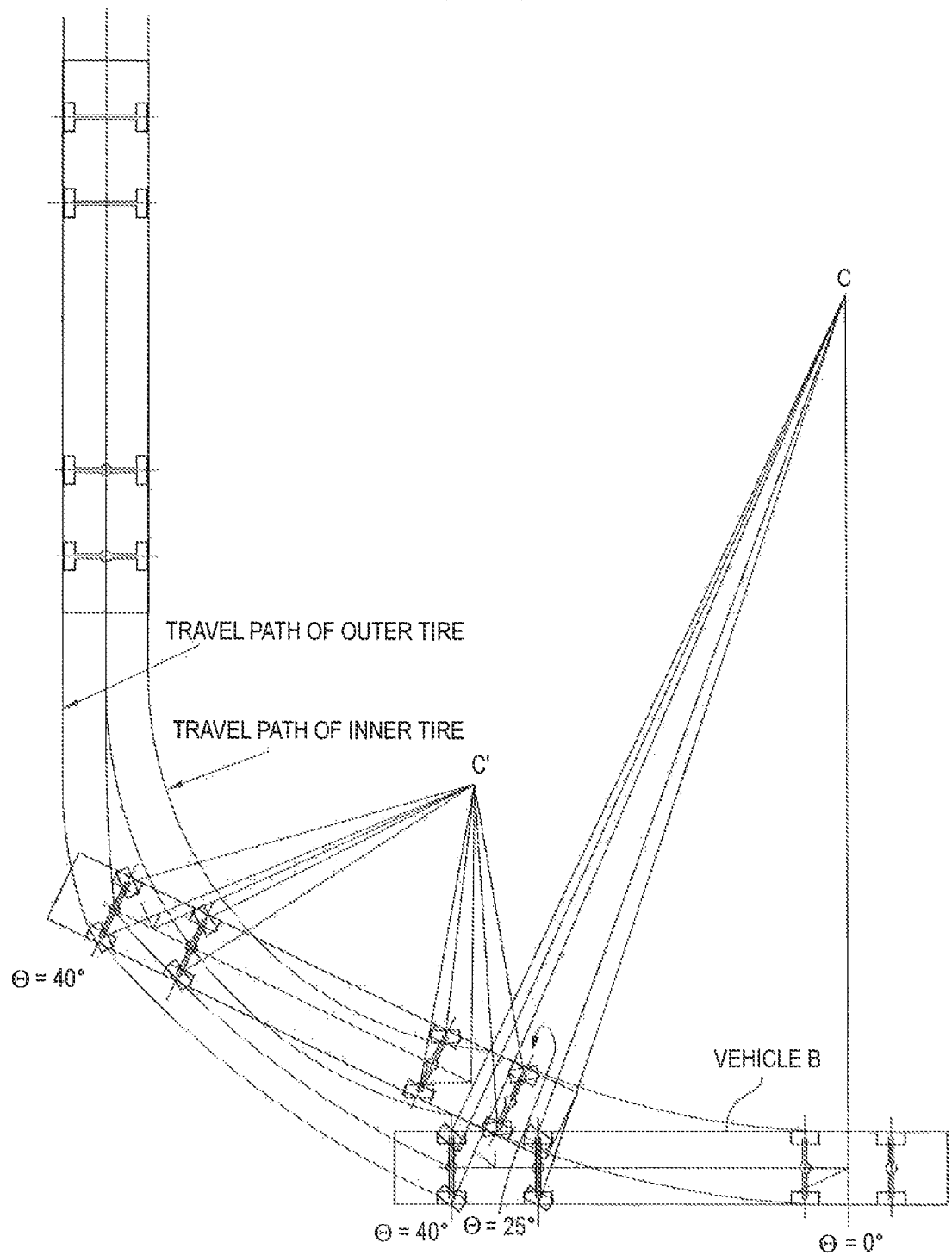
FIG. 20 is a schematic diagram illustrating the vehicle of FIG. 18 executing the 90-degree turn with an immediate wheel cut of 40 degrees for the four (4) wheels of both front axles, and a 'delayed' wheel cut of 25 degrees for the four (4) wheels of both rear wheels, executed at 50 feet into such turn.

FIG. 20 shows Vehicle B executing the 90-degree turn with an immediate wheel cut of 40 degrees for the four wheels of both front axles, and a 'delayed' wheel cut of 25-degrees for the four wheels of both rear wheels, executed at 50-feet into such turn.

The analysis at FIGS. 16-21 shows the maximum overall width of the wheel track of Vehicle A, executing a common right angle turn using Ackermann Turning Geometry, and shows the maximum overall width of such wheel track of Vehicle B, executing two common right angle turns, with the rear wheels engaged at different points while executing such turn, again using Ackermann Turning Geometry.

Figure 21C:
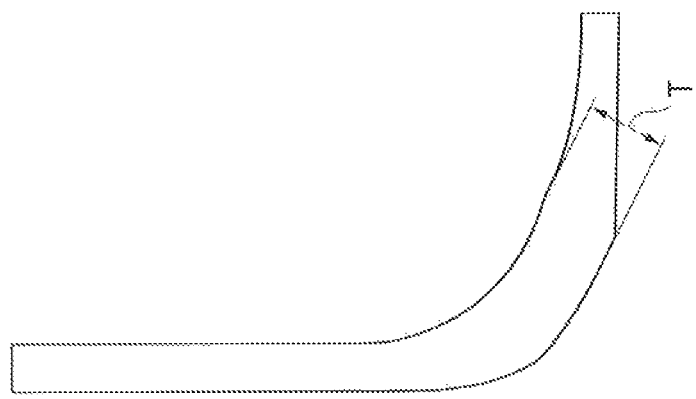
FIGS. 21A-21C illustrates the maximum wheel track width for: the combination tractor-trailer shown in FIG. 16 (21A); the vehicle shown in FIG. 18 (30-feet into a 90-degree turn, 21B); and the vehicle shown in FIG. 18 (50-feet into a 90-degree turn, 21C).
Figure 21B:
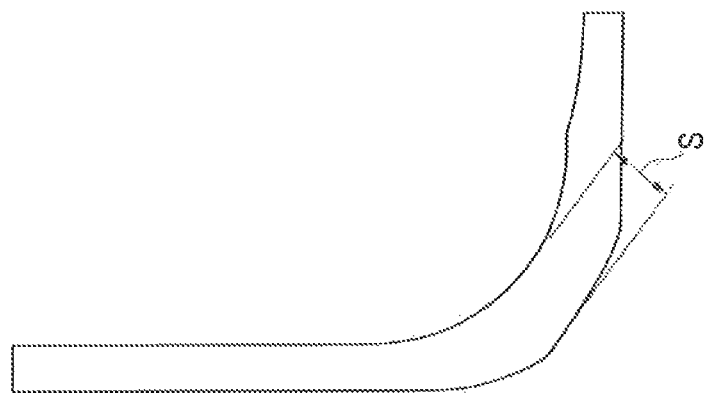
Figure 21A:
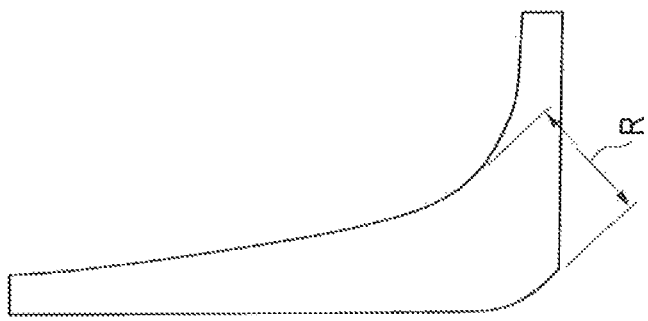

Finally, referring to FIG. 21, Vehicle A, the combination tractor trailer, has a maximum wheel track width "R" of 26 feet, 9 inches while making the 90-degree turn with the front wheel cut at 40 degrees. FIG. 21C illustrates that Vehicle B, the preferred example of the present invention, when executing the 90-degree turn with the two forward wheel cuts of 40-degrees, and the two rear wheel cuts at 25-degrees, while executing the turn at 50-feet into such 90-degree turn, has a maximum width "T" of the wheel track at 17 feet, 3 inches. Similarly, FIG. 21B illustrates that for Vehicle B executing this same 90-degree turn, with the rear wheels executing the turn at 30 feet into such 90-degree turn, the wheel track "S" is reduced to 14 feet, 4 inches, representing a 46.4% narrower wheel track than Vehicle A.

This comparison highlights the versatility and flexibility of all wheel steering with autonomous systems engaged, enabling continuous adjustment to instantly react to road conditions, obstacles or restrictions, and enabling the vehicle of the present invention to execute all wheel steering, or just four-wheel steering, applying the appropriate turn angle with the appropriate axles, at the most appropriate and safest point, during the execution of the turn. In any turning maneuver the Level 5 Autonomous Systems are essential for controlling the movement of both the front and rear of the vehicle. Any obstruction in the path of the front, sides or rear of the vehicle while turning will be identified and the autonomous systems will make an immediate adjustment, and if such obstruction cannot be avoided the vehicle will be stopped.

The physical advantages of each of the design configurations of the present invention, coupled with the Critical Path Control and Geometry-Based Path Tracking, both algorithms that may be used in Level 5 Autonomous Vehicle Architecture, enable each design configuration of the present invention to perform steering functions safely, efficiently and productively.

Often observed at intersections are tractor-trailer configurations attempting to execute a 90-degree turn, and before such turn can be completed successfully the driver must either wait for oncoming cars in the roadway being entered to move from the lanes, or clear the lanes, or even stop, and if such turn is being attempted when there is no option for oncoming cars to move from, or clear, such lanes, the combination vehicle driver may have no option but to execute the turn with the trailer wheels rolling off the roadway and rolling over the outside curb.

The steering geometry of all eight wheels of the present invention, in any of the design configurations disclosed here, may enable wheel cuts deeper than 40-degrees, and theoretically such wheel cut at all 8-wheel positions may not need to be much deeper than 40 or 45 degrees, as the advantages of all-wheel steering become evident; however, any determination of how all such angles of wheel cuts affect turning geometry again underscores the importance of building a prototype.

To determine axle weight balance with a water level load, the analysis is straight-forward as there are a number of variables not present with the four-axle vehicle of the present invention that are present with the five-axle articulating combination vehicles; such as: 1) tractor wheelbases, 2) fifth wheel locations, 3) setting of trailer axles that conform to the state in which such vehicle operates, and 4) if the combination vehicle is not internal combustion, rather battery-electric or hydrogen-electric, the location of the ESDS components, as such components can only be carried between the tractor front axle and rear tandem axles, or partially behind the cab, above the frame if the ESDS is hydrogen-electric (as illustrated in prior art FIGS. 12-15), and never carried under the trailer cargo body, which may in-and-of-itself create an unsolvable empty weight imbalance.

The comparison would be with a three-axle 150-inch wheelbase tractor, a 53-foot tandem trailer, a wheelbase front axle to middle of trailer tandems at 51-feet, exactly the same overall wheelbase of the four-axle non-articulating vehicle shown in FIGS. 4 and 5, and an overall length of 66-feet, and the 62-foot long four-axle configuration of the preferred example of the present invention.

FIGS. 4 and 5 detail the axle layout of a 62-foot long four-axle vehicle of the present invention. The axle weight variability in this vehicle is very low as the undermount spaces housing the ESDS and related steering, braking and suspension componentry are equally spread throughout the length of the vehicle. The added weight of the two rear differentials and attached electric motors is offset by the weight of the steel cab and in-cab components. The components in the undermount spaces are identical on both sides of the vehicle, adding to overall weight balance. If a rear cargo lift was used there would be a weight balance with the front mounted electric cargo refrigeration and heating system located directly above the operator compartment, and if there was one and not the other there is ample room in both the primary undermount spaces 14 and 24 to fully compensate for this imbalance by adjusting the location of the battery pack or fuel cells and hydrogen fuel tanks.

All four axle empty weights of the four-axle configuration of the preferred example of the present invention should be very close; however, without a prototype it is difficult to be precise. One estimate is that there may not be more than a 1,000 lbs. 'total' differential among all four axles from exhibiting near identical weights on such four axles of the preferred example of the present invention.

With the four axles directly under the cargo body, with the empty axle weights being very close, and with the load balancing air suspension system making load-leveling adjustments, in a water-level axle load analysis, the loaded axle weights of each axle may be very close to 20,000 lbs., and in my experience in the trucking industry it may be almost impossible to achieve the same result in a water-level load analysis with the physical variability in the above-described configuration of the five-axle tractor-trailer combination vehicle.

A center-of-mass or gravity analysis, also cannot be made with precision without a prototype being built; however, the preferred example of the present invention shown on FIGS. 4-5 may have all the ESDS hardware, all the steering, suspension and brake components and both electric motors 'below' the top of the frame. The comparison to the five-axle combination vehicle, which may have much of its diesel engine above the frame, a tractor cab above the frame, a fifth wheel and upper trailer coupler, weighing 1,500 lbs., above the frame, and if the ESDS is hydrogen-electric it may also have significant ESDS components mounted behind the cab and above the frame, indicating a much higher center-of-gravity (compare FIGS. 14-15). If there is a refrigeration/heating system and/or a rear cargo lift, the weight effect may be identical to both vehicle configurations.

With no speculation necessary, the center-of-gravity of the four-axle preferred example of the present invention is clearly significantly lower than the five-axle combination vehicle's center-of-gravity. The safety implications are significant. With a 40,000 lb. cargo load in the 53-foot trailer, with no offsetting weight below such cargo weight, the comparative stability of the four-axle configuration of the preferred example of the vehicle of the present invention, as compared to the five-axle combination vehicle in common use today, will be substantial.

Often observed on the Weather and News Channels are tractor-trailer combination vehicles being 'blown-over' from strong winds. Such an event is extremely unlikely with any of the design configurations of the present invention, as a direct result of the very low center of gravity designed into each such design configuration.

Persons of ordinary skill in the art will now recognize that the non-articulating commercial vehicle of the present invention provides a plethora of advantages over articulating tractors and trailers. Preferred vehicle configurations for the non-articulating commercial vehicle of the present invention are as follows:

| | GVWR | | |
|---|---|---|---|
| | 80,000 | 60,000 | 40,000 |
| No. of Axles | 4 | 3 | 2 |
| Steer Axles | 4 | 3 | 2 |
| Drive Axles | 2 | 2 | 1 |
| Wheelbase | 51 feet | 32 to 39 ft. | 20 to 29 ft. |
| Body Length | 62 to 72 ft. | 53 to 60 ft. | 41 to 50 ft. |
| Cargo Body | 57 to 67 ft. | 48 to 55 ft. | 36 to 45 ft. |
| Energy Space | 74 ft. to 84 ft. | 64 ft to 78 ft. | 50 to 68 ft. |

These preferred design configurations, and others apparent to those of ordinary skill upon reading the foregoing disclosure, provide a number of advantages over traditional articulating tractors and trailers, and 2-axle straight trucks, including:

1) Only two (2) sources of power: electric and pneumatic, no hydraulic systems used for brakes, steering, or lift brakes as hydraulics are expensive, heavy and high-maintenance;
2) No less than four (4) times the space typically available for power generation components for increased operating range (on tractors, energy has to sit between the steer axle and the forward drive axle, and placing battery-electric or hydrogen-electric system components anywhere on a trailer is neither practical or possible);
3) All electric energy is preferably only produced by battery-electric or hydrogen electric systems housed in undermount spaces located near the center of the vehicle at or below the frame, enabling enhanced axle weight balance and vehicle stability;
4) All compressed air energy may be produced by pneumatic systems with (e.g.) 4 electric air compressors and 4 pressurized supply air tanks and 4 pressurized service air tanks, affording exceptional security and safety for vital components of the vehicles;
5) Longer relative cargo bodies than articulating vehicles with comparable wheelbases;
6) All vehicle bodies are preferably fully skirted, with aerodynamic front bumpers, front sides and roof shaped for reduced drag and reduced wind resistance. Any vortex causing air instability at the gap between the cargo space and the operator's compartment is eliminated;
7) Total of eight (8) tires with low rolling resistance and automatic tire air pressure management;
8) Electric brakes (brake by wire) on all eight (8) wheel positions for brake balance, and electric regeneration from all eight (8) wheel positions;
9) Load-leveling and ride-height control pneumatic suspension an all four (4) axles, with 2 reserve electric air compressors, 2 reserve pressurized air storage tanks and 2 reserve pressurized air service tanks;
10) Solar panels to power electric cargo refrigeration/heating and reserve power, with such panels 24 inches preferably shorter than the overall length of the vehicle body;
11) No pivot-point in non-articulating body, and with low center of gravity with all power generation components, both propulsion and non-propulsion, housed in spaces located at or below the top of the frame, the incidence of roll-overs is likely to decrease and jack-knives would be impossible;
12) Weight reduction with elimination of separate tractor cab, frame, fifth wheel, trailer upper coupler, fifth axle and related tires and wheels, and trailer landing gear;
13) Enhanced axle loading balance with all axles located directly under the cargo body.
14) With the elimination of manual and external connections of low and high voltage electrical wires and pressurized air lines, there is immediate adaptability to autonomous systems for steering, braking, acceleration, balanced axle loading, suspension ride-height controls, cargo temperature management, and telematics, with all such connectivity preferably hard-wired, directly and permanently connected, and enclosed in weatherproof and secure spaces, and in heated spaces if necessary.
15) Electric all-wheel steering systems, with algorithms designed for application of all wheel steering systems affecting the width of wheel path when turning, reducing body roll, controlling lane change timing and execution, and for controlling vehicle tracking, both in-phase and counter-phase tracking (algorithms identified above, designed for all-wheel steering systems).
16) Drive axles are driven independently, and can be powered simultaneously or separately for energy management and vehicle control on horizontal and vertical curves.
17) Two (2) low steps for safer entrance and exit from the operator compartment.
18) Charging ports for batteries may be located at front, middle and rear of vehicle.

The above description is not intended to limit the meaning of the words used in the following claims that define the invention. Persons of ordinary skill in the art will understand that a variety of other designs still falling within the scope of the following claims may be envisioned and used. It is contemplated that these additional examples, as well as future modifications in structure, function, or result to that disclosed here, will exist that are not substantial changes to what is claimed here, and that all such insubstantial changes in what is claimed are intended to be covered by the claims.

I claim:

1. An integrated, non-articulating commercial vehicle comprising a vehicle body with four steerable axles, and a cab that does not pivot relative to the vehicle body, wherein the vehicle has a battery-electric-powered or hydrogen-electric-powered propulsion system, and wherein the vehicle body has a center of gravity that is substantially lower than a center of gravity for an articulating tractor-trailer combination commercial vehicle with a comparably-sized vehicle body.

2. The integrated, non-articulating commercial vehicle of claim 1, wherein the vehicle has a maximum wheel track width which is substantially less than the maximum wheel track width of an articulating tractor-trailer combination commercial vehicle with a comparably-sized overall length.

3. The integrated, non-articulating commercial vehicle of claim 1, wherein the vehicle's frame, axles, brakes, suspension, tires and wheels are rated for a maximum GVWR of 80,000 pounds, and wherein the vehicle has a wheelbase of at least 51 feet, an overall body length of at least 62 feet, a cab length of at least 5 feet, a cargo body length of at least 57 feet, an energy space of at least 74 lineal feet, and wherein the four steerable axles comprise a front axle, a rear axle, and at least two middle axles located between the front and rear axles;

wherein one or two of the two rear steerable axles may be driven by an electric motor attached directly to such axles or axles and powered by a battery-electric or hydrogen-electric propulsion system; and whereas, when two axles are driven, such axles are driven independently, whereby either of the two driven axles may be automatically engaged or disengaged by a Level 5 autonomous system of the vehicle, or manually engaged or disengaged, where such action is based upon the demand for motive power, and such demand is related to one or more of the following parameters: gross weight of the vehicle; wind; road surface; road grade: temperature; and an expected extension of an operating range of the vehicle when only one driven axle is engaged.

4. The integrated, non-articulating commercial vehicle of claim 3, wherein the vehicle has a GVWR of 82,000 pounds to account for the extra weight of the battery-electric or hydrogen-electric propulsion system.

5. The integrated, non-articulating commercial vehicle of claim 1, wherein the vehicle has all-wheel steering, the vehicle includes wheels with single-wide-based tires at all axle positions, a tire air pressure management system manages the air pressure for each tire, and wherein the vehicle has a substantially increased cargo volumetric capacity and longer cargo floor space as compared to 53-foot long trailers lawfully operated on public roadways using an articulating tractor-trailer combination commercial vehicle.

6. The integrated, non-articulating commercial vehicle of claim 1, wherein the vehicle has a substantially increased weight-carrying capacity in relation to an articulating tractor-trailer combination commercial vehicle with a comparably-sized vehicle body.

7. The integrated, non-articulating commercial vehicle of claim 1, wherein a water-level load on each axle is substantially equal, all axles are located directly under the vehicle body, and ride height control pneumatic suspension is provided at each axle.

8. The integrated, non-articulating commercial vehicle of claim 1, wherein a top portion of the vehicle includes solar panels used to power refrigeration and heating inside the vehicle body, and for reserve power.

9. The integrated, non-articulating commercial vehicle of claim 1, wherein the vehicle body includes energy storage and delivery systems ("ESDS") providing power for battery-electric or hydrogen-electric systems, the ESDS housed in undermount spaced located near a center of the vehicle, enabling the vehicle to function with a dual axle drive system where each drive axle can be operated independently.

10. The integrated, non-articulating commercial vehicle of claim 1, wherein the vehicle includes electric brakes, electric steering components which are hard-wired to all axles, pneumatic suspension systems that are permanently plumbed from pressurized air tanks to all axles, wherein no hydraulic systems are used, and wherein compressed air energy is produced by electric air compressors and pressurized supply air and service air tanks.

11. The integrated, non-articulating commercial vehicle of claim 1, wherein the vehicle has a lower or similar drag coefficient to that of an articulating tractor-trailer combination commercial vehicle having a trailer with a comparably-sized overall length to that of the vehicle body of the non-articulating vehicle.

12. The integrated, non-articulating commercial vehicle of claim 1, further comprising electric brake systems providing regenerative energy production at all wheels.

13. The integrated, non-articulating commercial vehicle of claim 1, further comprising electric, hard-wired rear-mounted cargo lifts and electric, hard-wired electric braking systems, each of which regenerate electricity back to a source of energy production.

14. The integrated, non-articulating commercial vehicle of claim 1, wherein all of the axles have compressed air suspension systems controlling axle weight equalization and frame height control, and wherein the compressed air originates from a system with a redundant backup.

15. The integrated, non-articulating commercial vehicle of claim 1, wherein the vehicle facilitates adoption of Level 5 autonomous vehicle architecture using hard-wired electrical connectivity, directly-plumbed pneumatic connectivity, and all-wheel steering.

16. The integrated, non-articulating commercial vehicle of claim 1, wherein two of the axles are independently driven by a battery-electric or hydrogen-electric propulsion system, with the power being transmitted independently to each of the two axles based upon the power demands of one or more of the following parameters: weight; grade; road surface; temperature; and wind.

17. The integrated, non-articulating commercial vehicle of claim 1, further comprising a single drive axle that is constantly engaged, to facilitate driving when terrain or weather are not material factors.

18. An integrated, non-articulating commercial vehicle with a cab and a vehicle body configuration, wherein the vehicle's frame, axles, brakes, suspension, tires and wheels are rated for a maximum GVWR of 60,000 pounds, and wherein the vehicle has at least three steer axles including a front axle, an intermediate axle, and a rear axle, a wheelbase of between 32-39 feet, a body length of between 53-60 feet, and an energy space of at least 64 lineal feet;

wherein any one, or any two, of the three steerable axles is driven by a battery-electric or hydrogen-electric propulsion system; and wherein when two axles are driven such axles are driven independently, whereby either of the two driven axles may be automatically engaged or disengaged by Level 5 autonomous systems of the vehicle, or manually engaged or disengaged, where such action is based upon the demand for motive power, and such demand is related to one or more of the following parameters: gross weight of the vehicle; wind; road surface; road grade; temperature; and an expected extension of an operating range of the vehicle when only one driven axle is engaged.

19. The integrated, non-articulating commercial vehicle of claim 18, wherein the cargo body length is between 48-55 feet, and wherein the energy space is between 64-78 lineal feet.

20. The integrated, non-articulating commercial vehicle of claim 18, wherein the power being transmitted to any one of the driven axles is transmitted independently based upon the power demands of one or more of the following parameters: weight; grade; road surface; temperature; and wind.

* * * * *

UNITED STATES PATENT AND TRADEMARK OFFICE
CERTIFICATE OF CORRECTION

PATENT NO. : 12,077,235 B2
APPLICATION NO. : 17/981799
DATED : September 3, 2024
INVENTOR(S) : Gerald Thomas Niedert It is certified that error appears in the above-identified patent and that said Letters Patent is hereby corrected as shown below:

In the Claims

Claim No. 3, starting at Column 39, Line 23 should read "An integrated, non-articulating commercial vehicle with a cab and a vehicle body configuration, wherein the vehicle's frame, axles, brakes, suspension, tires and wheels are rated for a maximum GVWR of 60,000 pounds, and wherein the vehicle has at least three steer axles including a front axle, an intermediate axle, and a rear axle, a wheelbase of between 32-39 feet, a body length of between 53-60 feet, and an energy space of at least 64 lineal feet;
    wherein any one, or any two, of the three steerable axles is driven by a battery-electric or hydrogen-electric propulsion system; and
    wherein when two axles are driven such axles are driven independently, whereby either of the two driven axles may be automatically engaged or disengaged by Level 5 autonomous systems of the vehicle, or manually engaged or disengaged, where such action is based upon the demand for motive power, and such demand is related to one or more of the following parameters: gross weight of the vehicle; wind; road surface; road grade; temperature; and an expected extension of an operating range of the vehicle when only one driven axle is engaged."

Claim No. 4, starting at Column 39, Line 48 should read "The integrated, non-articulating commercial vehicle of Claim 3, wherein the cargo body length is between 48-55 feet, and wherein the energy space is between 64-78 lineal feet."

Claim No. 5, starting at Column 39, Line 52 should read "The integrated, non-articulating commercial vehicle of Claim 1, wherein the vehicle's frame, axles, brakes, suspension, tires and wheels are rated for a maximum GVWR of 80,000 pounds, and wherein the vehicle has a wheelbase of at least 51 feet, an overall body length of at least 62 feet, a cab length of at least 5 feet, a cargo body length of at least 57 feet, an energy space of at least 74 lineal feet, and wherein the four steerable axles comprise a front axle, a rear axle, and at least two middle axles located between the front and rear axles;
    wherein one or two of the two rear steerable axles may be driven by an electric motor attached directly to such axles and powered by a battery-electric or hydrogen-electric propulsion Signed and Sealed this
Nineteenth Day of November, 2024

Katherine Kelly Vidal
*Director of the United States Patent and Trademark Office* system; and whereas, when two axles are driven, such axles are driven independently, whereby either of the two driven axles may be automatically engaged or disengaged by a Level 5 autonomous system of the vehicle, or manually engaged or disengaged, where such action is based upon the demand for motive power, and such demand is related to one or more of the following parameters: gross weight of the vehicle; wind; road surface; road grade; temperature; and an expected extension of an operating range of the vehicle when only one driven axle is engaged."

Claim No. 6, starting at Column 39, Line 61 should read "The integrated, non-articulating commercial vehicle of Claim 1, wherein the vehicle has all-wheel steering, the vehicle includes wheels with single-wide-based tires at all axle positions, a tire air pressure management system manages the air pressure for each tire, and wherein the vehicle has a substantially increased cargo volumetric capacity and longer cargo floor space as compared to 53-foot long trailers lawfully operated on public roadways using an articulating tractor-trailer combination commercial vehicle."

Claim No. 7, starting at Column 39, Line 66 should read "The integrated, non-articulating commercial vehicle of Claim 1, wherein the vehicle has a substantially increased weight-carrying capacity in relation to an articulating tractor-trailer combination commercial vehicle with a comparably-sized vehicle body."

Claim No. 8, starting at Column 40, Line 4 should read "The integrated, non-articulating commercial vehicle of Claim 1, wherein a water-level load on each axle is substantially equal, all axles are located directly under the vehicle body, and ride height control pneumatic suspension is provided at each axle."

Claim No. 9, starting at Column 40, Line 8 should read "The integrated, non-articulating commercial vehicle of Claim 1, wherein a top portion of the vehicle includes solar panels used to power refrigeration and heating inside the vehicle body, and for reserve power."

Claim No. 10, starting at Column 40, Line 16 should read "The integrated, non-articulating commercial vehicle of Claim 1, wherein the vehicle body includes energy storage and delivery systems ("ESDS") providing power for battery-electric or hydrogen-electric systems, the ESDS housed in undermount spaced located near a center of the vehicle, enabling the vehicle to function with a dual axle drive system where each drive axle can be operated independently."

Claim No. 11, starting at Column 40, Line 24 should read "The integrated, non-articulating commercial vehicle of Claim 1, wherein the vehicle includes electric brakes, electric steering components which are hard-wired to all axles, pneumatic suspension systems that are permanently plumbed from pressurized air tanks to all axles, wherein no hydraulic systems are used, and wherein compressed air energy is produced by electric air compressors and pressurized supply air and service air tanks."

Claim No. 12, starting at Column 40, Line 30 should read "The integrated, non-articulating commercial vehicle of Claim 1, wherein the vehicle has a lower or similar drag coefficient to that of an articulating tractor-trailer combination commercial vehicle having a trailer with a comparably-sized overall length to that of the vehicle body of the non-articulating vehicle."

CERTIFICATE OF CORRECTION (continued)
U.S. Pat. No. 12,077,235 B2

Claim No. 13, starting at Column 40, Line 33 should read "The integrated, non-articulating commercial vehicle of Claim 1, further comprising electric brake systems providing regenerative energy production at all wheels."

Claim No. 14, starting at Column 40, Line 39 should read "The integrated, non-articulating commercial vehicle of Claim 1, further comprising electric, hard-wired rear-mounted cargo lifts and electric, hard-wired electric braking systems, each of which regenerate electricity back to a source of energy production."

Claim No. 15, starting at Column 40, Line 44 should read "The integrated, non-articulating commercial vehicle of Claim 1, wherein all of the axles have compressed air suspension systems controlling axle weight equalization and frame height control, and wherein the compressed air originates from a system with a redundant backup."

Claim No. 16, starting at Column 40, Line 49 should read "The integrated, non-articulating commercial vehicle of Claim 1, wherein the vehicle facilitates adoption of Level 5 autonomous vehicle architecture using hard-wired electrical connectivity, directly-plumbed pneumatic connectivity, and all-wheel steering."

Claim No. 17, starting at Column 40, Line 56 should read "The integrated, non-articulating commercial vehicle of Claim 5, wherein the vehicle has a GVWR of 82,000 pounds to account for the extra weight of the battery-electric or hydrogen-electric propulsion system."

Claim No. 18, starting at Column 40, Line 60 should read "The integrated, non-articulating commercial vehicle of Claim 1, wherein two of the axles are independently driven by a battery-electric or hydrogen-electric propulsion system, with the power being transmitted independently to each of the two axles based upon the power demands of one or more of the following parameters: weight; grade; road surface; temperature; and wind."

Claim No. 19, starting at Column 41, Line 15 should read "The integrated, non-articulating commercial vehicle of Claim 1, further comprising a single drive axle that is constantly engaged, to facilitate driving when terrain or weather are not material factors."

Claim No. 20, at Column 41, Line 20 should read "Claim 3" instead of "Claim 18".